US009411637B2

(12) United States Patent
Ramesh et al.

(10) Patent No.: US 9,411,637 B2
(45) Date of Patent: Aug. 9, 2016

(54) ADAPTIVE PROCESS IMPORTANCE

(71) Applicant: Apple Inc., Cupertino, CA (US)

(72) Inventors: Ananthakrishna Ramesh, Cupertino, CA (US); Yosen Lin, Cupertino, CA (US); Damien Pascal Sorresso, San Francisco, CA (US); James Michael Magee, Orlando, FL (US); Kevin James Van Vechten, San Francisco, CA (US); Umesh Suresh Vaishampayan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 422 days.

(21) Appl. No.: 13/656,506

(22) Filed: Oct. 19, 2012

(65) Prior Publication Data

US 2013/0332941 A1   Dec. 12, 2013

Related U.S. Application Data

(60) Provisional application No. 61/657,611, filed on Jun. 8, 2012.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/48 | (2006.01) |

(52) U.S. Cl.
   CPC .................... G06F 9/4843 (2013.01)

(58) Field of Classification Search
   None
   See application file for complete search history.

(56) References Cited

U.S. PATENT DOCUMENTS

| 5,742,825 | A | 4/1998 | Mather et al. |
| 6,088,727 | A | 7/2000 | Hosokawa et al. |
| 6,366,947 | B1 * | 4/2002 | Kavner .......................... 709/203 |
| 6,668,269 | B1 | 12/2003 | Kamada et al. |
| 7,240,212 | B2 | 7/2007 | Arnone et al. |
| 7,810,093 | B2 | 10/2010 | Jones et al. |

(Continued)

FOREIGN PATENT DOCUMENTS

| JP | H09-054699 A | 2/1997 |
| JP | H10-187638 A | 7/1998 |

(Continued)

OTHER PUBLICATIONS

International Preliminary Report on Patentability for PCT/US2013/042533 mailed Dec. 18, 2014.

(Continued)

Primary Examiner — Craig Dorais
(74) Attorney, Agent, or Firm — Blakely, Sokoloff, Taylor & Zafman LLP

(57) ABSTRACT

A method and apparatus of a device that changes the importance of a daemon process is described. In an exemplary embodiment, the device receives a message from a user process destined for daemon process, wherein the daemon process executes independently of the user process and the first daemon process communicates messages with other executing processes. The device further determines if the first message indicates that the importance of the first daemon process can be changed. If the first message indicates the importance of the first daemon process can be changed, the device changes the importance of the first daemon process. The device additionally forwards the first message to the first daemon process.

23 Claims, 21 Drawing Sheets

(56) References Cited

U.S. PATENT DOCUMENTS

| | | |
|---|---|---|
| 7,823,157 B2 | 10/2010 | Need et al. |
| 2002/0178208 A1 | 11/2002 | Hutchison et al. |
| 2005/0131865 A1* | 6/2005 | Jones et al. ................ 707/2 |
| 2005/0138242 A1* | 6/2005 | Pope et al. ................ 710/48 |
| 2007/0264956 A1* | 11/2007 | Bicker et al. .............. 455/186.1 |
| 2007/0277184 A1 | 11/2007 | Yasuda et al. |
| 2011/0060927 A1* | 3/2011 | Fillingim et al. ............ 713/320 |
| 2011/0252429 A1 | 10/2011 | Ballard et al. |

FOREIGN PATENT DOCUMENTS

| | | |
|---|---|---|
| JP | 2010-044703 A | 2/2010 |
| JP | 2011-198027 A | 10/2011 |
| WO | WO 96/31824 | 10/1996 |

OTHER PUBLICATIONS

International Search Report and the Written Opinion of the International Searching Authority, for corresponding International Application No. PCT/US13/42533, mailing date Dec. 6, 2013, 10 pages.

\* cited by examiner

ADAPTIVE PROCESS IMPORTANCE

RELATED APPLICATIONS

Applicant claims the benefit of priority of prior, provisional application Ser. No. 61/657,611, filed Jun. 8, 2012, the entirety of which is incorporated by reference.

FIELD OF INVENTION

This invention relates generally to process management and more particularly to modifying a process importance based on a received message.

BACKGROUND OF THE INVENTION

A mobile device is a device that has plurality of running processes that are used to interact with a user and perform numerous services on that mobile device. For example, a mobile device may have one user application process running in the foreground, where the user can interact with this process. Other running processes are daemon processes that provide services to the user application process or other running processes. These other processes consume hardware resources of the mobile device, such as central process units (CPUs), memory, input/output, etc. These consumed resources can compete for the resources needed for the user application work and can result in user interface glitches, the device feeling sluggish, slow to respond to touches, and/or the device locking up as there is too little resources being applied to the user application process.

One way to alleviate this problem is to have the daemon and/or other background processes executing at a lower importance than the user application process. By having these other processes executing at a lower importance that the user application process, the user application process can consume more of the mobile device resources and the mobile device will appear to the user as having more responsiveness. A problem with this scenario is that when the user application process makes a request to one of these daemons or other background processes for a service or information, these daemon or background process will service the request at the lower importance. This can cause the user application process to wait to have the service request fulfilled.

SUMMARY OF THE DESCRIPTION

A method and apparatus of a device that changes the importance of a daemon process is described. In an exemplary embodiment, the device receives a message from a user process destined for daemon process, wherein the daemon process executes independently of the user process and the first daemon process communicates messages with other executing processes. The device further determines if the first message indicates that the importance of the first daemon process can be changed. If the first message indicates the importance of the first daemon process can be changed, the device changes the importance of the first daemon process. The device additionally forwards the first message to the first daemon process.

In a further embodiment, the device receives a message from an importance donor process destined for an adaptive daemon, wherein the adaptive daemon has yet to be launched. The device further determines if the message indicates that the importance of the adaptive daemon process can be changed. If the message indicates the importance of the adaptive daemon process can be changed, the device launches the adaptive daemon process with an importance that is different a default importance associated with the adaptive daemon process. The additionally forwards the message to the launched adaptive daemon process.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
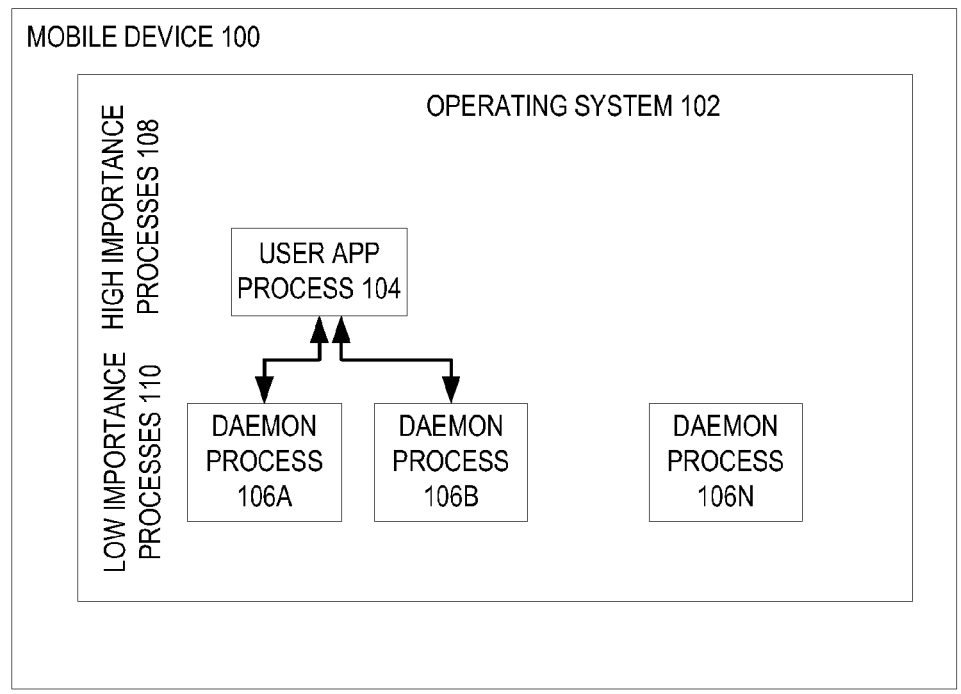
FIG. 1 is a block diagram of one embodiment of a mobile device with a user application process communicating with daemon processes that are executing at a low importance.

A method and apparatus of a device that changes the importance of a daemon process is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that changes the importance of a daemon process is described. In one embodiment, the device can change the importance of daemon processes by having a kernel of the device detect a message being sent from a higher importance process to an adaptive daemon process. An adaptive daemon process is a daemon process that can have the importance raised or lowered depending on the environment the adaptive daemon process is running in. In this embodiment, the kernel detects this message and marks the message with importance. In addition, the kernel can promote the importance of the adaptive daemon process, if this daemon process is running, or launch the adaptive daemon with a higher importance, prior to the adaptive process receiving the message from the kernel. By having the adaptive daemon process importance promoted prior to the adaptive daemon process receiving the message, the adaptive daemon process can receive and process the message as a higher importance process. In addition, the kernel takes an assertion for the adaptive daemon process.

After the adaptive daemon process receives the message, the adaptive daemon process handles the message and sends a reply to the message to the originator of the initial message.

In addition, the adaptive daemon process drops the assertion on the adaptive daemon process. The kernel decrements the number of pending assertions on the adaptive daemon process. If the number of pending assertions for the adaptive daemon process is zero, the kernel demotes the importance of the adaptive daemon process to the default importance of that adaptive daemon process. In one embodiment, the default importance of a daemon, if the importance that a daemon will have in the absence of being promoted or being launched with a promoted importance.

FIG. 1 is a block diagram of one embodiment of a mobile device 100 with a user application process communicating with daemon processes that are executing at a low importance. In one embodiment, the mobile device 100 can be a smartphone, laptop, personal digital assistant, music playing device, gaming device, etc. While the device described here as a mobile device, the inventions described herein can also be used in a personal computer, server, or any other device that executes multiple processes. In FIG. 1, mobile device 100 include an operating system 102 that is a set of software used to manage computer hardware resources and provides common services for other running computer programs, such as application programs. In one embodiment, the operating system 102 manages different running processes by time scheduling when a processor of the mobile device 100 executes each running process. In one embodiment, a process is an instance of a computer program that is being executed. In this embodiment, the process may be a user application that is executing as a result of user input. Another example of a process is a daemon process that provides one or more services to a user application, another daemon, other process, etc. For example and in one embodiment, a daemon process give a status of wireless hotspot service, list of installed applications, facilitate a search, monitor and adjust device power settings, etc. In one embodiment, the daemon process is not tied to a particular hardware resource of the mobile device.

In one embodiment, some processes may have a higher or lower importance than other processes. In one embodiment, the process importance is a collection of properties associated with a task/process to indicate that actions are needed on behalf of the user who is currently interacting with the device. It indicates that the user is waiting for these actions to be completed and this task/process is to be treated with urgency. A process importance can include central processing unit schedule priority for the process, input/output scheduling, network bandwidth priorities, memory management, graphics resource usage, etc., and/or a combination thereof. A process priority is a property that indicates the urgency with which that task or thread is picked to run (or execute) when there are many tasks that need to be run. This process priority is used by the operating system to schedule when a process is to be executed. In one embodiment, a process with a higher importance than other processes would consume a greater amount of the mobile device resources (e.g., processor resources, etc.). In this embodiment, a process with a higher importance would appear to run faster than a process of lower importance. In one embodiment, the importance may be assigned based on a range of numbers from a lowest importance to a highest importance. For example and in one embodiment, an importance range could range from one to ten, 0-127, low/high, or another range of values.

For example and in one embodiment, the following mobile device resource usage can be affected by the process importance. 1. Processor Scheduling. As described above, higher and lower importance processes may be assigned different processor scheduling "priorities" in such a way that lower importance processes do not interfere with higher importance processes.

2. Disk Scheduling: In one embodiment, processes with a higher importance are given priority over lower importance processes when accessing system storage units (e.g., magnetic hard drives and solid state hard disk units). In addition, lower importance processes (i.e., threads associated with processes in the background state) may be rate-limited in their access of system storage units.

3. Incoming Network Activity. In one embodiment, incoming network traffic may be moderated by dropping some or all packets destined for a lower importance process. In addition, artificially small buffer sizes may be reported to distal network sites so as to throttle incoming TCP (Transmission control protocol) traffic. One of ordinary skill in the art will recognize that TCP has an existing set of traffic flow control mechanisms relating to buffer sizes, so that traffic isn't sent over a network faster than the recipient can handle it. As previously noted, in one embodiment artificially small buffer sizes may be reported so that the sender slows or stops the flow of incoming traffic.

4. Outgoing Network Activity. In one embodiment, network access is mediated through the use of two (2) queues; one for jobs associated with higher importance processes and one for jobs associated with lower importance processes. It has been found beneficial to give the higher importance queue priority over the lower importance queue. By way of example, the higher importance queue may be given 100% priority over the background queue. At this setting, the only time a job in the lower importance queue will be serviced is if the higher importance queue is empty. In another embodiment, jobs in the higher importance queue may be serviced in any desired ratio with those from the lower importance queue, e.g., 90/10, 80/20, 75/27 or 50/50. In still another embodiment, once a job has been placed into a queue (e.g., the higher importance queue) it is not moved if the job's associated process is subsequently placed into a different operating state (e.g., lower importance). In yet another embodiment, a job's queue location is updated to reflect the operational status of its associated process.

5. Hardware Restrictions. In one embodiment lower importance processes are prevented from gaining access to certain system hardware resources. Illustrative hardware not available to lower importance processes include, but are not limited to: camera, GPU, accelerometer, gyroscope, memory consumption, proximity sensor and microphone.

In one embodiment, a user application process 104 could be running in the foreground, while one or more daemon processes 106A-N running in the background at an importance lower than user application process 104. A process running in the foreground is a process that is interacting with a user and a process running that is not interacting with the user would have these processes in the background. For example and in one embodiment, a user application process 104 running in the foreground on mobile device 100 may be a user application that is displayed on the mobile device 100. In this embodiment, the mobile device 100 can concurrently run one or more daemon process that are not displayed on the mobile device and are instead communicating with other processes. These daemon processes would be executing in the background and not directly visible to the user.

In one embodiment, the foreground and lower importance processes could be executing at different priorities. Because a foreground process would be interacting with the user, a foreground process would execute at a higher importance than the daemon processes that are lower importance processes. By having the foreground process run at a higher importance, the foreground process would get more of the processor resources and give the foreground process a better user experience as the foreground process would run faster.

In one embodiment, the operating system 102 includes the user application process 104 and the daemon processes 106A-N. In this embodiment, the user application process 104 is a higher importance process 108 and the daemon processes 106A-N are lower importance processes 110. In addition, the user application process 104 will get a higher share of the mobile device 100 resources as compared to the individual daemon processes 106A-N that are running at a lower importance. By having the user application process 104 running at a higher importance, the user application process 104 will appear to be running faster for the user.

As discussed above, one problem of this arrangement is that the user application process 104, at times, can request one or more services from the daemon processes 106A-B. In this embodiment, because the daemon processes 106A-B are running at a lower importance, it can take longer for the daemon to service this request. By the user application process 104 requesting services from one or more daemon processes 106A-B running at a lower importance, the user application process 104 appears to be running at the lower importance during the time that the daemon 106A-B services the request. For example and in one embodiment, the user application process 104 requests from a daemon the status of mobile hotspot, adjust and report on power management, perform searches, etc.

Figure 2:
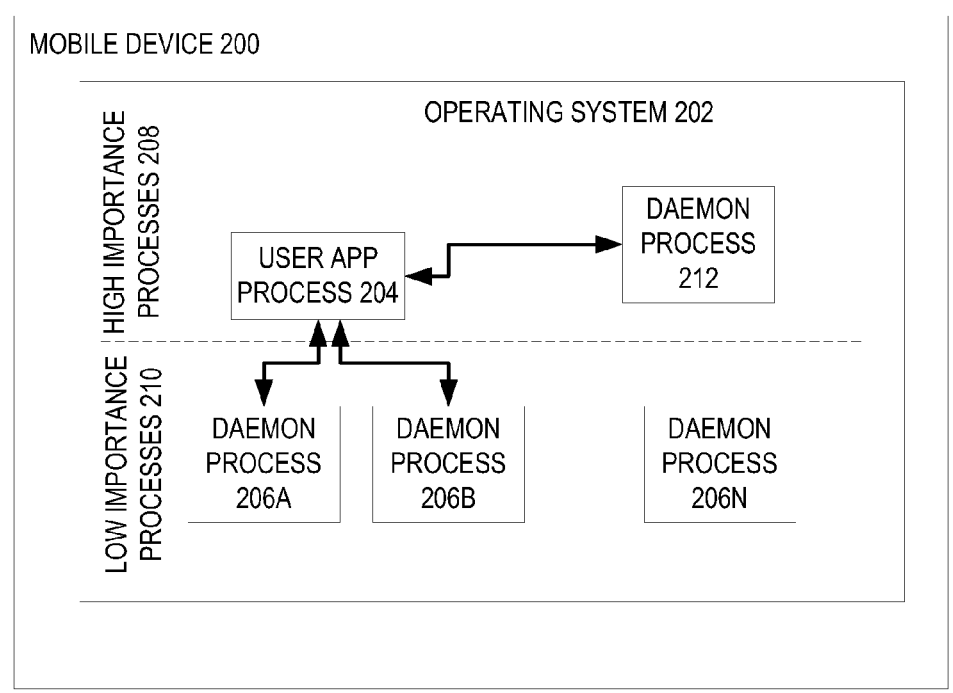
FIG. 2 is a block diagram of one embodiment of a mobile device with a user application process communicating with daemon processes that are executing in a mix of low and high importances.

FIG. 2 is a block diagram of one embodiment of a mobile device 200 with a user application process communicating with daemon processes that are executing in a mix of low and high importances. In FIG. 2 and in one embodiment, the operating system 202 of the mobile device 200 has a daemon process 212 that runs as one of the higher importance processes 208. In addition, the operating system 202 includes other daemon processes 206A-N that are running as lower importance processes 210 and the user application process 204. Furthermore, the user application process 204 makes service requests to low importance process daemons 206A-B and high importance process daemon 212.

By having the daemon process 212 running as one of the higher importance process 208, the user application process 204 does not experience a drop in performance by making a service request to daemon process 212. For this daemon process 212, having the daemon service requests alleviate the performance drop for the user application process 204. However, another problem arises because this daemon 212 may also process service requests from other daemons or other processes running in the operating system 202. By processing other service requests, the high importance daemon process 212 receives more of the mobile device 200 resources and reduces the amount of resources available to user application process 204. This problem can worsen as the number of daemon process running as high importance processes 208 increases. Furthermore, this situation still suffers form the problem of the low importance daemons handling service requests at a low importance.

FIGS. 1 and 2 illustrate problems with a performance of user application process being degraded by making service requests to daemon processes all running as low importance processes or running as a mixture of low and high priorities processes. In one embodiment, by having a daemon process importance promoted to a high importance for user application process service requests and run at low importance for other service requests, allows the user application process to have a better performance. This is because when a user application process makes a service request to a daemon process, this service request is processed at a higher importance. By having the service request processed at a higher process importance, the user application process will appear to run more quickly. For other service requests, the daemon would run at the lower importance and does not degrade the performance of the user application process for other functions.

In one embodiment, a process can include one or more threads, where a thread is the smallest unit processing that can be scheduled by the operating system. Multiple threads can exist within the same process and share resources the process resources (e.g., memory, instructions, context, etc.). In one embodiment, if the importance of a process is changed, all the threads will execute at the changed importance. In this embodiment, when the importance is raised or lowered in response to the receipt of a message or sending the message reply, all of the currently executing threads of that process will execute at the new importance. In another embodiment, some of the threads execute at the changed importance.

Figure 3A:
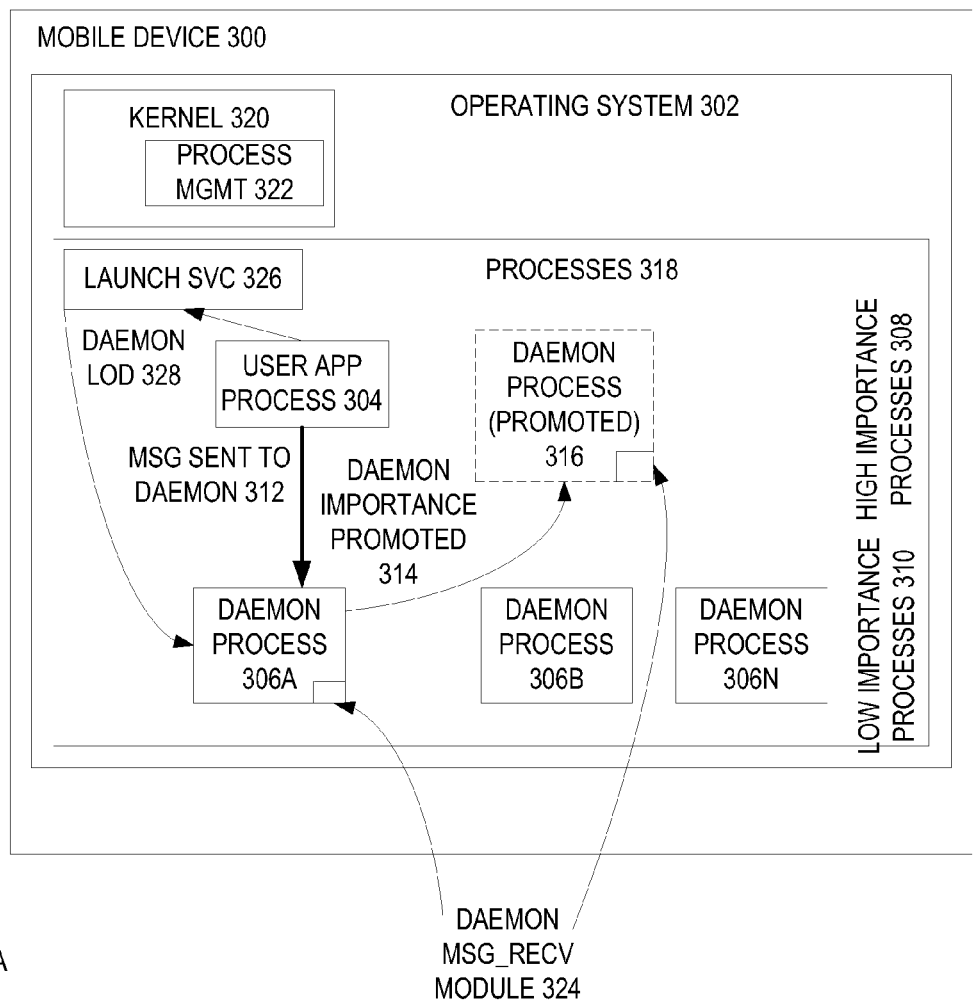
FIGS. 3A-B are block diagrams of one embodiment of a mobile device with a user application process communicating with a daemon process and the importance of the daemon process is promoted.

FIG. 3A is a block diagram one embodiment of a mobile device 300 with a user application process 304 communicating with a daemon process 306A and the importance of the daemon process 306A is promoted. In FIG. 3A, the mobile device 300 includes an operating system 302 that manages the execution of a user application process 304 and daemon processes 306A-N. In addition, the user application process 304 is running at a high importance and the daemon processes initially execute at a lower importance. When the user application process 304 requests a service from a daemon process, the daemon process is promoted to a higher importance to process this service request. In one embodiment, this daemon process 306A is an adaptive daemon, because the importance of this process can be adapted to the environment the process is operating in. For example and in one embodiment, the user application process 304 makes a service request to the daemon process 306A via message 312. In one embodiment, the message is an interprocess communication (IPC) message. In response to the message being queued for the daemon, the importance of the daemon is promoted to a higher importance, daemon 316. While in one embodiment, the importance of the promoted daemon 316 is the same as the requesting user application process 304, in alternative embodiments, the promoted importance of the daemon 316 can be greater or lesser than the importance of the requesting user application process 304.

In addition, the user application process 304 continues to execute after sending the message to the daemon process 306A and before receiving a reply to that message from the daemon process 306A. For example and in one embodiment, after the user application process 304 sends the message to the daemon process 306A and before the user application process 304 receives the reply to that message, the user application process 304 can receive input from a user, update a display for the user application process 304 (e.g., scroll, resize, rotate, etc.), and/or perform other functions. As another example, the user application process 304 does not suspend while waiting for a reply from the daemon process 306A/316.

In one embodiment, the daemon process 306A is running at the time the user application process 304 sends the service request message to the daemon process 306A. In this embodiment, the daemon process 306A is running independently of the user application process 304 and handles service requests from the user application process 304, other user application process(es), other daemon(s), other processes and/or a combination thereof. In addition, the daemon process 306A may have started before or after the user application process 304 started. For example and in one embodiment, the daemon process 306A is started when the mobile device boots up and the user application process 304 starts after the mobile device is booted. In this example, the daemon process 306A handles service request messages from one or more processes running on the mobile device independently of the user application process 304.

In another embodiment, the daemon process 306A is not running when the user application process 304 sends the message. In this embodiment, the daemon 306A is launched on demand with a higher importance than this daemon process 306A normally have. Launch on demand is further described in FIG. 8 below. In one embodiment, the launch services 326 handles the on-demand launching 328 of the daemon. In this embodiment, the service request message is forwarded to the launch services 326, and the launch services 326 launches the daemon 306A/316 as a higher importance process 316, where this daemon normally launches as a lower importance process 306A.

In FIG. 3A, and in one embodiment, the operating system kernel 320 handles the daemon process importance promotion. In another embodiment, the operating system kernel 320 handles the daemon process importance promotion using a process management module 322. In this embodiment, the process management module 322 handles the sending and receiving of the messages between the user application process 304 and the daemon process 306A/316. For example and in one embodiment, the process management module 322 promotes the daemon process 306A/316 promotion when the process management module 322 enqueues a message for the daemon process 306A/316. By handling the message passing between these two processes, the process management module 322 can manage the daemon process promotion. In addition, the daemon process 306A/316 includes daemon msg_recv module 324 that processes the received message. Processing the received message is further described in FIG. 6 below.

Figure 3B:
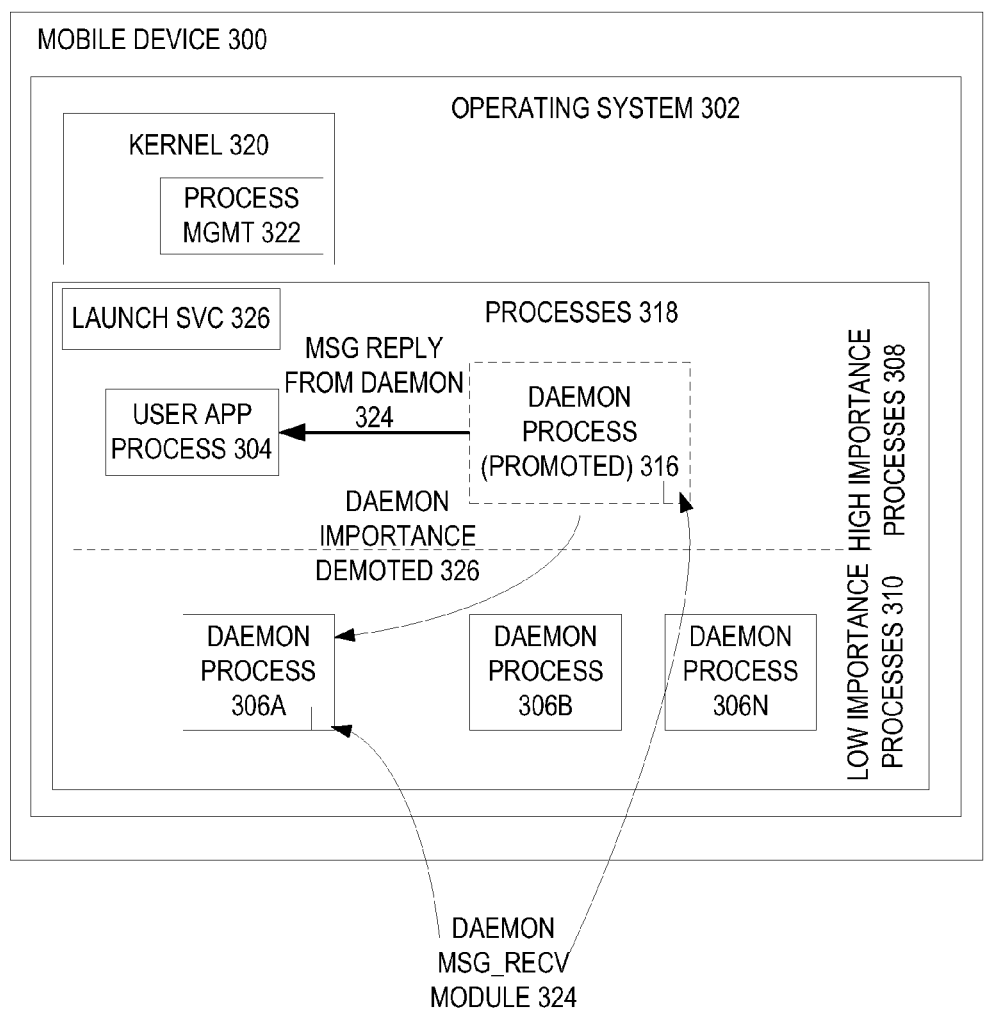

In one embodiment, after the daemon completes the processing of the message the daemon importance is returned to the initial daemon importance. FIG. 3B is a block diagram one embodiment of a mobile device 300 with a user application process 304 communicating with a promoted daemon process 316 and the importance of the daemon process 316 is demoted. In FIG. 3B, the mobile device 300 includes an operating system 302 that manages the execution of a user application process 304, daemon processes 306B-N, and a promoted daemon process 316. As in FIG. 3A, the user application process 304 is running at a high importance, the daemon processes 306B-N initially run at a lower importance, and the daemon 306A has been promoted to run at a higher importance, which is illustrated as the daemon process (promoted) 316. In one embodiment, the promoted daemon process 316 processes the message and sends a reply to the user application process 304. In this embodiment, in response to the sending of the message, the promoted daemon process 316 can be demoted back to its initial importance 306A. In addition, the daemon process 316 demotion can occur if the daemon process 306A importance is promoted while running or launched with the promoted importance. Process demotion is further described below, in which the promoted daemon process 316 drops an assertion that can lead to this process 316 being demoted. For example, process demotion is further described in FIG. 6 below.

In FIG. 3B, and in one embodiment, the operating system kernel 320 handles the daemon process demotion. In another embodiment, the operating system kernel 320 handles the daemon process promotion using a process management module 322. In this embodiment, the process management 322 handles the sending and receiving of the messages between the user application process 304 and the daemon process 306A/316. By handling the message passing between these two processes, the process management module 322 can manage the daemon process demotion. In addition, the daemon process 306A/316 includes daemon msg_recv module 324 that processes the received message. Processing the received message is further described in FIG. 6 below.

In one embodiment, the process demotion occurs by the promoted daemon process 316 dropping an assertion. For example and in one embodiment, a process assertion drop happens by the daemon process making a system call to the kernel. This system call indicates to kernel that the daemon process has completed the work on behalf of user application process. In this embodiment, the assertion notifies the operating system that the message has been processed and the process can be demoted. In one embodiment, the operating system decrements the number of pending assertions for the promotion of this daemon. In this embodiment, if there are no other assertions indicating that the importance of the daemon process is to be promoted, the importance of the promoted daemon process 316 is demoted to the default importance. Alternatively, if there are other pending assertions for this daemon, the operating system decrements the number of pending assertions for the promotion of this daemon. While in one embodiment, the importance of the daemon process is demoted to the default importance of the daemon process, in alternate embodiments, the demoted process importance can be lower or higher than the default importance. In one embodiment, the default importance is the importance of the process without the importance being changed.

For example and in one embodiment, consider an example of when a preferences application is launched and the user navigates to check the network settings of the mobile device. In this example, the mobile Internet sharing daemon would be represented by daemon process 306A and the preferences application would be the user application process 304. The preferences application sends a message to a mobile Internet sharing daemon (e.g., daemon process 306A) to query status information about a personal hotspot service. The mobile Internet sharing daemon, on receiving this message, determines if the tethering is available for that carrier and that the user is authorized for its usage. The mobile Internet sharing daemon returns that information back to the preferences application, which displays proper status for personal hotspot service.

In one embodiment, the mobile Internet sharing daemon is running when the preferences application sends the message to this daemon. In this embodiment, the service port for this daemon will be with the mobile Internet sharing daemon. When the message is sent from preferences application, the kernel, as part of queuing the message to the port, notices that the message is from a user application and destined to an adaptive daemon. The kernel takes an assertion, and promotes the mobile Internet sharing daemon to a higher importance if this daemon is running in at a lower importance (e.g., background importance). In addition, the message is marked to indicate that the message caused the kernel to hold an assertion. When the mobile Internet sharing daemon receives this message, this daemon checks whether that particular message caused an assertion by kernel, if so after processing and replying, the daemon tells the kernel to drop the assertion. On an assertion drop and with no other assertions pending, the kernel will demote the mobile Internet sharing daemon back to the default importance for this process (e.g., background importance).

In another embodiment, the mobile Internet sharing daemon is not running and this daemon process is launched on demand with an importance that is different from the one default importance of the daemon. For example and in one embodiment, consider the daemon the mobile Internet sharing daemon discussed above. If the mobile Internet sharing daemon is not currently running, the service port for the mobile Internet sharing daemon is stored with launch daemon. When the launch daemon gets a notification that this port has a message (e.g., an event message), the launch daemon invokes spawns a process to start the mobile Internet sharing daemon, which is an adaptive daemon. As one of the arguments for the launch, the launch daemon provides a handle to the port in question to kernel. The operating system kernel determines whether any pending messages includes the daemon service port is from the user application process and, in addition, carries an assertion to promote the daemon process. If this type of message exists, the kernel starts the launch of the mobile Internet sharing daemon in a promoted importance. In one embodiment, the promoted importance can be an importance that is higher than the default the mobile Internet sharing daemon importance and can be one that is the same, higher, or lower than the importance of the user application process. In this embodiment, the kernel holds assertions on the process at this time. If the message for the daemon does not include the assertion, the mobile Internet sharing daemon is launched in a default importance for this process. For example and in one embodiment, the mobile Internet sharing daemon is launched with a background importance.

Once the launch the mobile Internet sharing daemon process is completed, the mobile Internet sharing daemon rendezvous with the launch daemon and to get the service port transferred to the mobile Internet sharing daemon. The mobile Internet sharing daemon reads the message and checks if that message has caused an assertion, where the assertion is marked by kernel. If the message has caused an assertion, when the mobile Internet sharing daemon completes the message processing and replies to the message, the mobile Internet sharing daemon will drop the assertion. Once the pending assertions are dropped on the process, the mobile Internet sharing daemon goes back to the default process importance (e.g. background importance).

As another example, when the user starts using the mobile device, an application launcher application sends a message to a power daemon to hold a power assertion to prevent idle sleep. In one embodiment, the power daemon holds this assertion until a backlight of the mobile device is on. In this embodiment, once the user locks the device and no background audio is being played, application launcher application drops the power assertion. After the device is not in use for a period of time, the mobile device backlight is turned off. The application launcher application drops the power assertion and enable the kernel to idle sleep the device.

In this example, the power daemon is an adaptive daemon, which means the power daemon has a default importance that can be promoted in response to a message from a higher importance process, such as the application launcher application. This can reduce the impact on foreground application activity. For example and in one embodiment, when message from the application launcher application arrives at the power daemon, the power daemon is boosted to a higher importance and on completion of the message processing by the power daemon, the power daemon will be dropped back to the default importance of the power daemon (e.g., background importance). This example illustrates where an adaptive daemon can run in normal importance during the time of message processing and does not impact on the foreground application unnecessarily. This example further illustrates how an adaptive daemon helps to improve the responsiveness of a foreground application without consuming or contending too many resources like input/output, processing units, etc. In addition, another daemon can make a request to the power daemon without the importance of the power daemon being promoted. This other daemon's request will be processed at the default importance of the power daemon.

In a further example and embodiment, the kernel has the ability to transfer ownership of the receive end of a communication channel (port) between processes. For example and in one embodiment, this transfer is what happens when an adaptive daemon requests ownership of the service port from the launching daemon. As another example and in another embodiment, an adaptive daemon A has a receive right for a port P. In this example, there are N importance donating messages enqueued on the port P—so the daemon has N importance donation/boost references. If the adaptive daemon receives the N messages, processes them and then drops an assertion after each one, the adaptive daemon will revert back to normal adaptive importance. But in this case/instance, instead of receiving all N messages, the adaptive daemon transfers ownership of the receive end of that port to some another process B by sending the receive end of port P in the contents of a message destined to a different port Q. In this case, adaptive daemon A loses N boosts, and process B (if also adaptive) gains N boosts at the time the receive-right transferring message is enqueued.

If adaptive daemon B then transfers the receive end of port Q to some other process before receiving the message containing the receive end of port P, adaptive daemon B has to transfer the number of importance donation assertions for the other messages in port Q as well as the N importance assertions associated with port P. In this way, the importance donation accounting is recursive according to the receive-right contents of any messages enqueued on any of those ports.

In another example and embodiment, if the adaptive daemon A decides that it is idle, the adaptive daemon A may choose to exit to save even more system resources. Either that or this daemon may just have crashed. In either case, the receive right for port P is transferred back to the launching daemon (e.g. via a built-in backup mechanism in the operating system interprocess communication system). If an importance-donating message was enqueued just prior to this exit/crash, the adaptive daemon A would have an importance donation at the time it stopped running. In this example, the kernel does not want the boost of the adaptive daemon to be permanently lost. Thus, when the launching daemon gets the receive end of port P back, the launching daemon detects that there is an enqueued message already and relaunches the next instance of the adaptive daemon A (e.g. termed A2). The adaptive daemon A2 needs to be boosted not just by the amount of importance donating messages that arrive after the port is returned to the launching daemon, but also by the message already enqueued on that port previously. This "importance updates through port migration" mechanism can cause this to happen.

Figure 4:
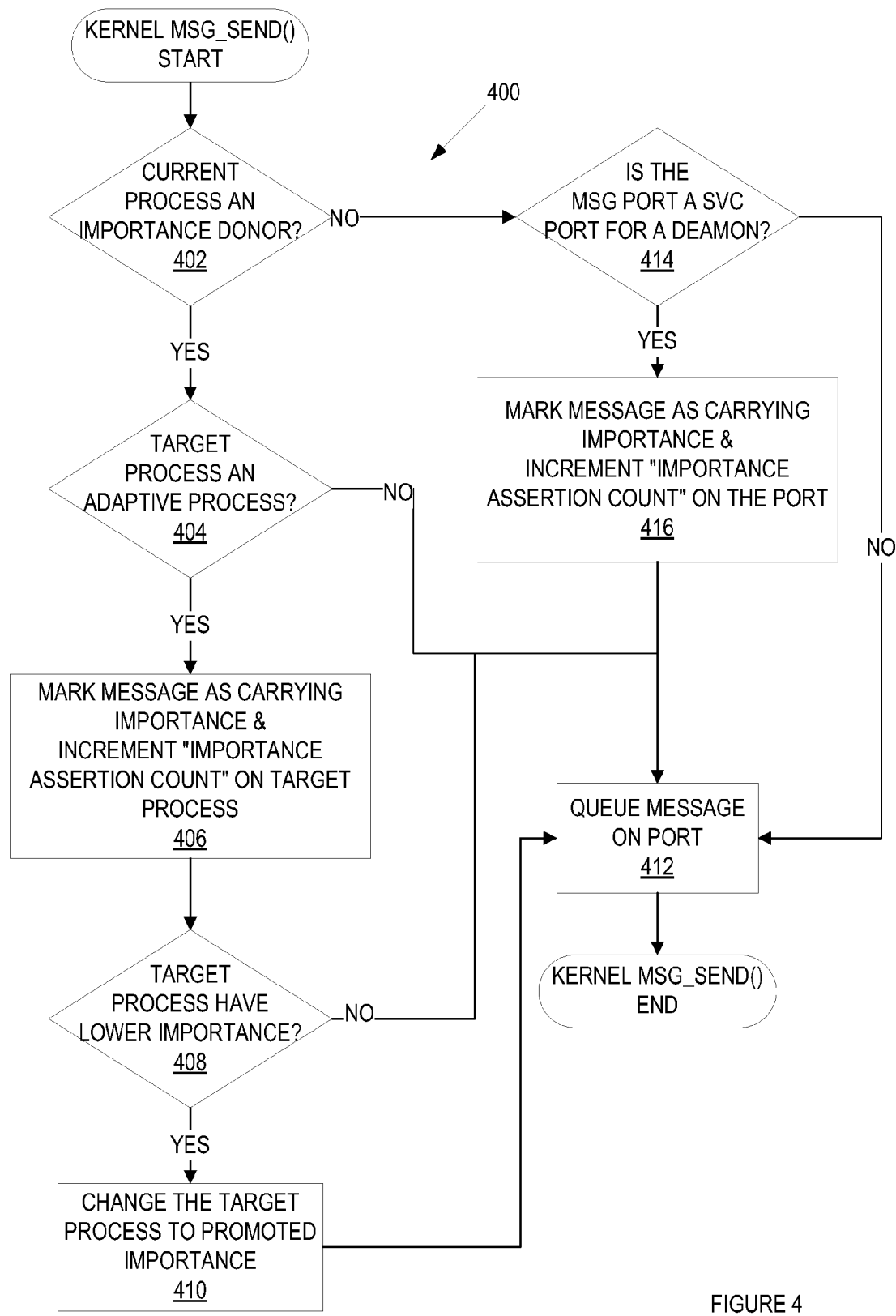
FIG. 4 is a flowchart of one embodiment of a process of a kernel to send a message that is used to promote a daemon importance based on a message destined for that daemon.

FIG. 4 is a flowchart of one embodiment of a process 400 of a kernel to send a message that is used to promote a daemon process importance based on a message received by the daemon. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a kernel, such as kernel 320 of FIG. 3A or 3B.

In FIG. 4, process 400 begins by determining if the current process that is sending the message is an importance donor at block 402. In one embodiment, an importance donor is a process who is the user application process and the user is waiting for an action to complete. In another embodiment, the importance donor is also a daemon or service that is performing work on behalf of the user application process. In this embodiment, the daemon can have a promoted importance. In one embodiment, an importance donor is a user application process that is running in the foreground. For example and in one embodiment, an importance process is the user application process 304 as described in FIG. 3A above. If the current process is not an importance donor, execution proceeds to block 414 below.

If the current process is an importance donor, at block 404, process 400 determines if the target process that is to receive the message is an adaptive daemon process. If the target process is not an adaptive daemon process, execution proceeds to block 412 below. If the target process is an importance receiver, process 400 marks the message as carrying importance and increments the "importance assertion account" on the target process at block 406. In one embodiment, by incrementing the "importance assertion count," process 400 takes an assertion on the target process. This assertion count is used later on by the kernel to determine whether to demote the importance of the assertion. In this embodiment, the assertion is later dropped in association with processing the message by the target process. Dropping an assertion is further described in FIG. 6 below. For example and in one embodiment, when a user wants to know the networking status, the user preferences application process sends a message to mobile Internet sharing daemon about the status of a network hotspot service. As per the description above, the preferences application is the user application process and the mobile Internet sharing daemon is the adaptive daemon, where the message to the mobile Internet sharing daemon is marked as carrying importance and the importance assertion count for the mobile Internet sharing daemon is incremented.

At block 408, process 400 determines if the target process has a lower importance. In one embodiment, process 400 determines if the target process has a lower importance than the current process. For example and in one embodiment, process 400 compares the importance of the current and target processes.

Process 400 changes the target process to the promoted importance at block 410. In one embodiment, process 400 changes the target process to the importance of the current process. In this embodiment, process 400 promotes the target process importance upon or prior to enqueueing the message on a port queue and before the target process dequeues the message for message processing. By promoting the target process prior to the target process dequeuing the message, the target process can dequeue and process the message at the higher importance. For example and in one embodiment, the current process could be executing at a foreground importance and process 400 changes the target process importance to the foreground importance. In another embodiment, process 400 changes the target process importance to a value that is different than the importance of the current process. In one embodiment, process 400 changes the importance of the target process as described above in FIG. 3A. Execution proceeds to block 412 below.

If the current process determined at block 402 above, is not an importance donor, process determines if the message port is a service port at block 414. In one embodiment, if the current process is not an importance donor, the current process is a launching daemon that is handling message for a daemon that is to be launched on demand. In this embodiment, a service port is a port that is used to communicate message to the target process for that service. If the is a message port is a service port, at block 416, process 400 marks the message as carrying importance and increments the "importance assertion account" on the service port. In one embodiment, by incrementing the "importance assertion count" on the service port, process 400 is marking that the port may have been launched on demand by an adaptive daemon or another importance donor. Execution proceeds to block 412 below. If the is a message port is not a service port, execution proceeds to block 412 below.

At block 412, process 400 queues the message on a port. In one embodiment, the port is a port used for the target process. While in one embodiment, Mach interprocess communication (IPC) ports are supported, in other embodiments, other types of ports are supported (e.g., local domain sockets, pipes, etc.), any other type of IPC, etc.

Figure 5:
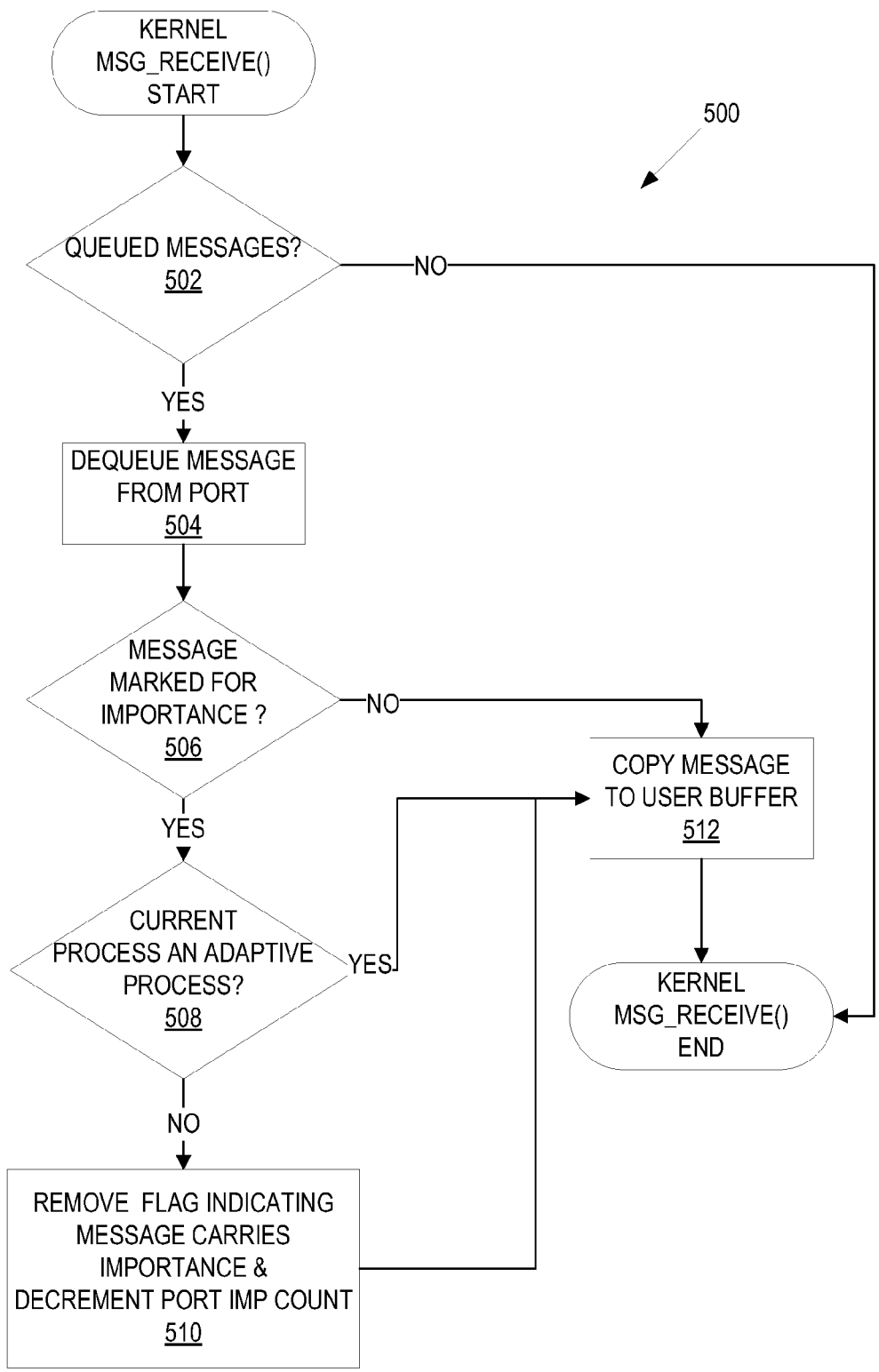
FIG. 5 is a flowchart of one embodiment of a process of a kernel to receive a message that is used to promote a daemon importance based on a message destined for that daemon.

FIG. 4 above describes a process that is used by the kernel to send a message that can be used to promote the importance of the daemon process. FIG. 5 is a flowchart of one embodiment of a process 500 of a kernel to receive a message that is used to promote a daemon importance based on a message destined for the daemon. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 500 is performed by a kernel, such as kernel 320 of FIG. 3A or 3B.

In FIG. 5, process 500 begins by determining if there are queued messages for the current process at block 502. In one embodiment, process 500 determines if a message is queued for a port associated with a current process, such as the daemon process as described above in FIG. 3A. In one embodiment, the current process is an adaptive daemon. If there is no queued message, execution process 500 ends.

If there is a message, process 500 dequeues the message from the port at block 504. In one embodiment, process 500 removes that message from the port queue. Process 500 determines if the message is marked for importance at block 506. In one embodiment, process 500 examines the message to determine if the message is marked for importance. For example and in one embodiment, the message includes an importance bit and if the importance bit is set, the message is marked for importance. If the message is not marked for importance, execution proceeds to block 512 below.

If the message is marked for importance, process 500 determines if the current process is an adaptive daemon process at block 508. If the current process is not an adaptive daemon process, process 500 removes the flag indicating the message carries an importance at block 510. In one embodiment, process 500 unsets the importance bit of the message. In addition, process 500 decrements the port importance count at block 510. In this embodiment, the port importance count is a counter indicating number of outstanding messages that are from the importance donor process. Execution proceeds to block 512 below. If current process is an adaptive process execution proceeds to block 512 below.

At block 512, process 500 copies the message to the user buffer. In one embodiment, by copying the message to the user buffer, the current process can process the message. In one embodiment, the current process performs process 600 to process the message as described in FIG. 6 below.

Figure 6:
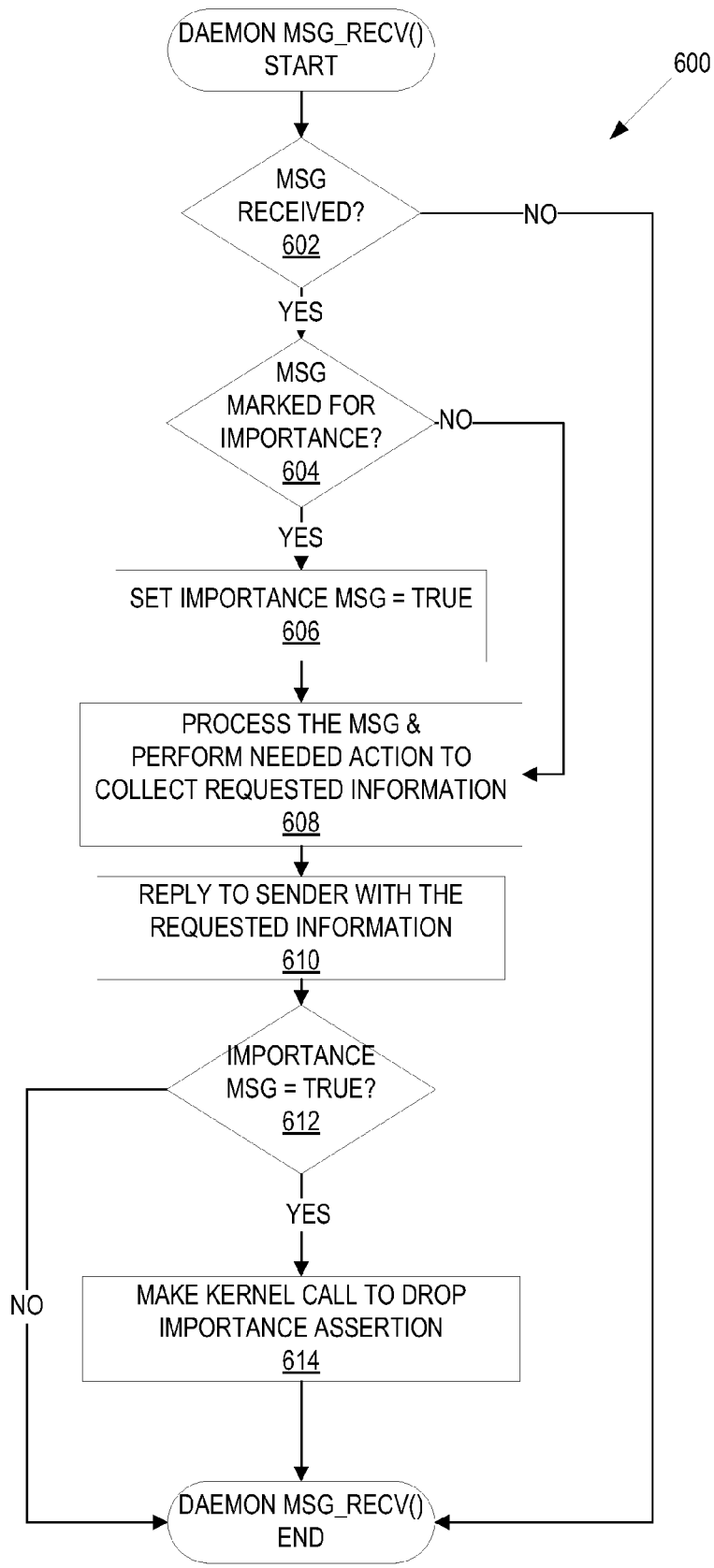
FIG. 6 is a flowchart of one embodiment of a process of an adaptive daemon to receive a message that is used to promote a daemon importance.

FIG. 6 is a flowchart of one embodiment of a process 600 of an adaptive daemon process to receive a message that is used to promote a daemon importance based on a message received by that daemon. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 600 is performed by an adaptive daemon, such as daemon 306/316 of FIG. 3A or 3B. In FIG. 6, process 600 begins by determining if a message is received. In one embodiment, process 600 determines if there is a message in a user buffer that is used by the daemon process. If there are no messages for process 600 to process, execution ends.

If there is a message for process 600 to process, process 600 determines if the message is marked for importance at block 604. In one embodiment, process 600 checks if an importance flag is set, such as an importance bit as described above. If message is not marked for importance, execution proceeds to block 608 below. If the message marked for importance, process 600 sets a local variable to a non-zero value, where the local variable indicates whether the message is important or not at block 606.

Process 600 processes the message at block 608. In one embodiment, process 600 performs the actions to collect the requested information. For example and in one embodiment, process 600 could determine a status of a mobile internet sharing service, perform power management, perform a search, return a list of installed applications, etc. Process 600 sends the reply to the sender with the requested information at block 610. In one embodiment, process 600 sends the reply to the user application process as described above in FIG. 3B.

At block 612, process 600 determines if the message is marked for importance. In one embodiment, process 600 checks if the importance flag is set to true. If the message is marked for importance, at block 614, process 600 makes a kernel call to drop an importance assertion. If the importance flag is not message is marked for importance, execution ends.

Figure 7:
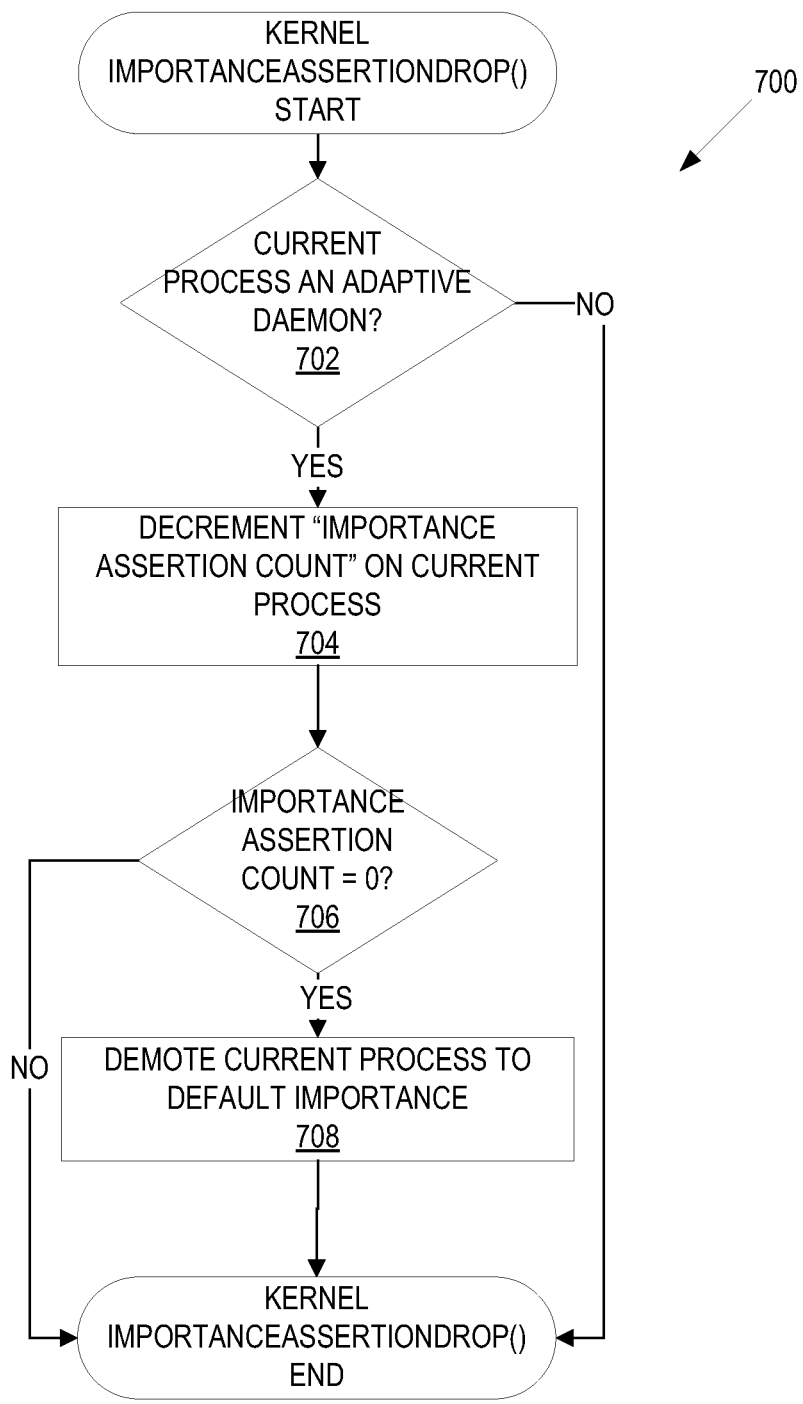
FIG. 7 is a flowchart of one embodiment of a process of a kernel to drop an importance assertion.

In FIG. 6 above, process 600 makes a call to drop an importance assertion. The dropping of the importance assertion is used by the kernel to determine whether the importance of the daemon process should be returned to the default importance of the daemon process. FIG. 7 is a flowchart of one embodiment of a process 700 of a kernel to drop an importance assertion. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 700 is performed by a kernel, such as kernel 320 of FIG. 3A or 3B. In FIG. 7, process 700 begins by determining if the current process is an adaptive daemon at block 702. If the current process is not an adaptive daemon, execution ends.

If the process in an adaptive daemon, process 700 decrements the "importance assertion count" on the current process at block 704. As described above, an importance assertion count keeps tracks of the number of current assertions that have been raised for this process. Process 700 determines if the importance assertion count is zero at block 706. An importance assertion count of zero means that there are not any current assertions raised for the current process. If the importance assertion count is zero, process 700 demotes the current process to the default importance at block 708. If the importance count is not zero at block 706, execution ends.

Figure 8:
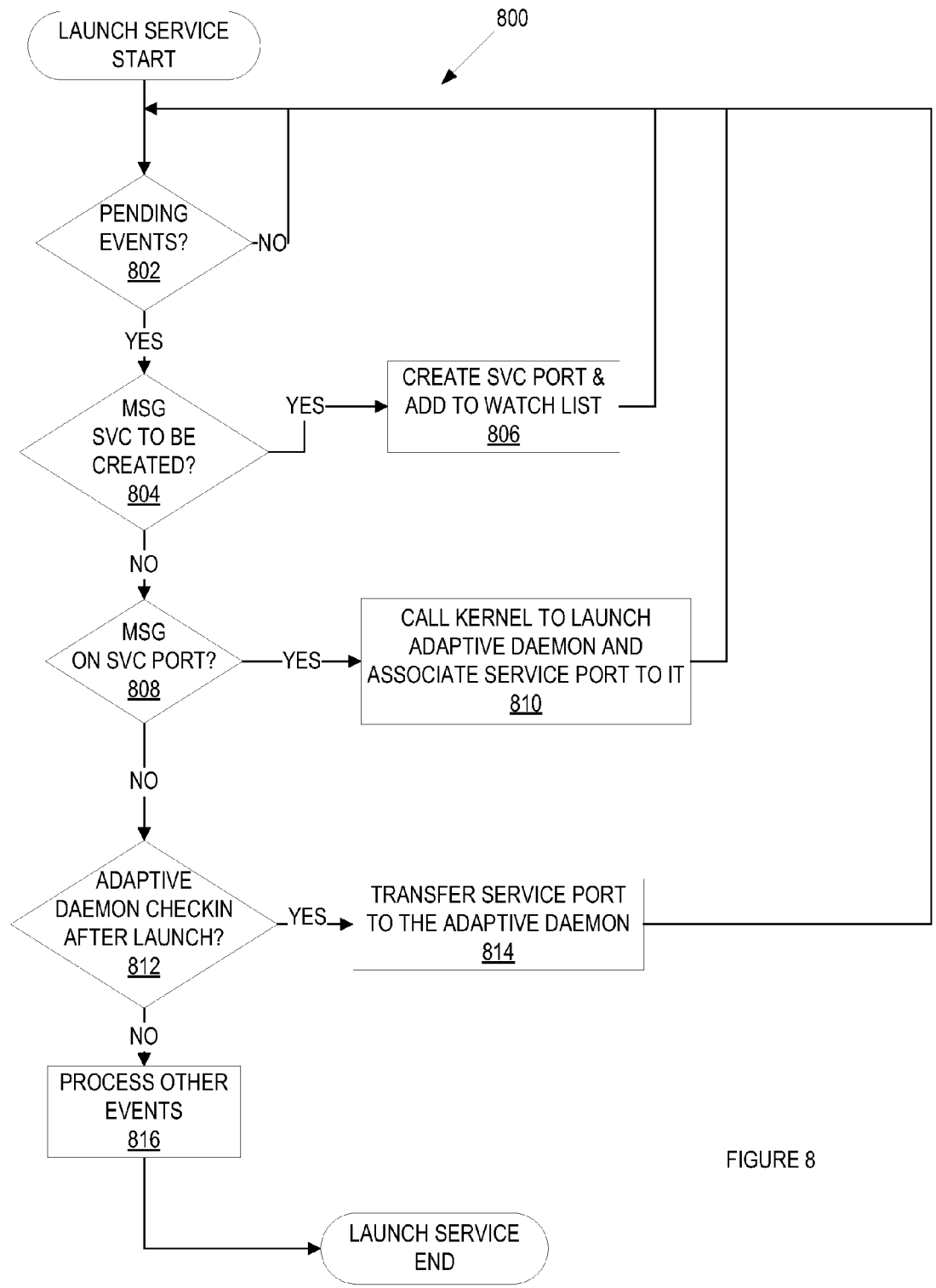
FIG. 8 is a flowchart of one embodiment of a process to launch a service on demand.

FIG. 8 is a flowchart of one embodiment of a process 800 to launch a service on demand. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 800 is performed by a launch service, such as launch service 326 of FIG. 3A or 3B. In FIG. 8, process 800 begins by determining if there are any pending events for process 800 to process at block 802. If there are no pending events, process 800 proceeds back to block 802 to wait for other pending events.

If there is a pending event, at block 804, process 800 determines if the event indicates that a message service should be created. In one embodiment, a message service is a set of services (e.g., a library) used both by the daemon and user application to manage establishing the message path/connection, messaging interchange, and importance donations properties between them. It provides an abstraction to interchange information between user application and daemon and, additionally, handles importance donation seamlessly. For example and in one embodiment, the message service can be a daemon, such as search daemon, that can send and receive messages to handle and fulfill service requests. If the event does indicate that a message service is to be created, at block 806, process 800 creates a service port for the message service and adds this service port to the watch list. In one embodiment, by creating the service port and adding this port to a watch list, process 800 can determine if a message arrives for this service on the created port. Execution proceeds to block 802 above as process 800 waits for another event to process.

If the event is not an event indicating that a message service is to be created, at block 808, process 800 determines if there is a message on a service port for a daemon that is to be launched. If there is such a message, at block 810, process 800 calls the kernel to launch the daemon and associate the service port to this daemon. In one embodiment, process 800 determines which is the appropriate daemon for this service port and calls the kernel to launch that daemon. In addition, process 800 associates the message service port to the launched daemon. In this embodiment, the kernel inspects the service port and determines whether this port has any importance messages. If the kernel determines there is an importance messages, the kernel will launch the daemon in higher importance. If there are no importance messages in the service port, the kernel launches the daemon in default importance of that daemon. Furthermore, because the kernel knows the daemon/service port association, if the daemon is launched in normal/lower importance and if later an importance message is queued on this service port, the kernel can promote the daemon to higher importance at the time of queuing the importance message. Execution proceeds to block 802 above as process 800 waits for another event to process.

If, at block 808, there is not a message on the service port, process 800 determines if the event is for an adaptive daemon check-in after launch of that daemon at block 812. If so, at block 814, process 800 transfers the service port to the adaptive daemon. In one embodiment, this allows the adaptive daemon to send and receive messages on that port. Execution proceeds to block 802 above as process 800 waits for another event to process. If the event is not an adaptive daemon check-in, at block 816, process 800 processes other events.

Figure 9:
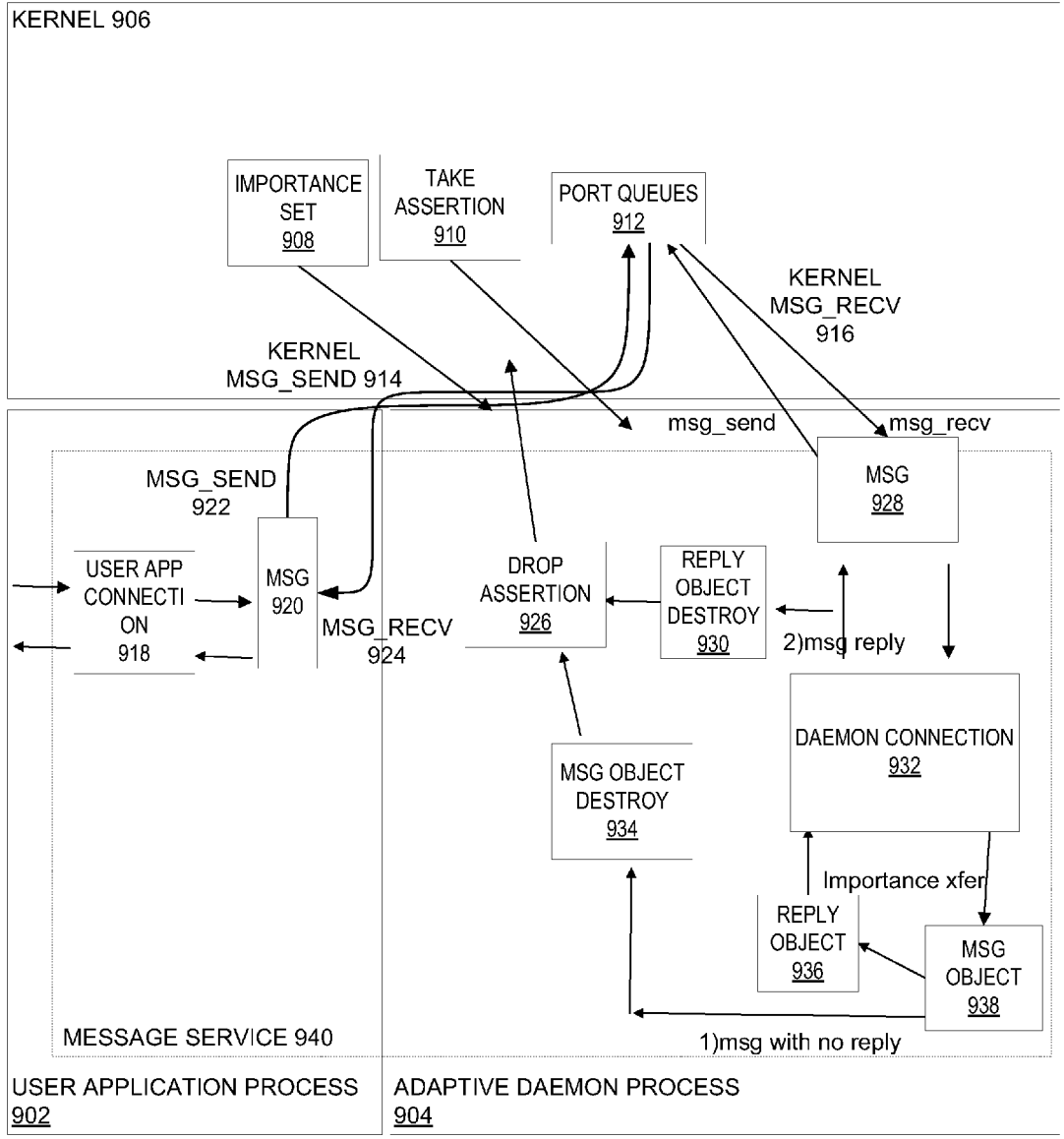
FIG. 9 is a block diagram of one embodiment of a system that promotes and demotes an adaptive daemon process importance.

As described above, a daemon process importance can either be promoted for a running daemon based on a message from an importance donor being enqueued for that daemon or a message from an importance donor triggering the daemon being launched with the promoted importance. When the daemon importance is promoted, the kernel takes an assertion for the daemon. This daemon process can have its importance demoted once the pending assertions drop to zero. An assertion is dropped by the daemon in response to the daemon processing a message that is marked with importance. FIG. 9 is a block diagram of one embodiment of a system 900 that promotes and demotes an adaptive daemon process importance. In FIG. 9, system 900 includes a user application process 902, adaptive daemon process 904, and kernel 906. In one embodiment, the user application process 902 uses a message service 940 to send and receive messages with the adaptive daemon process 904. In this embodiment, the message service 940 is a service that works across the user application process 902 and the adaptive daemon process 906 to manage the communicating of the messages between the user application process 902 and the adaptive daemon process 906. In one embodiment, the message service 940 supports synchronous and asynchronous message communication.

In one embodiment, the user application process 904 uses the message service 940 to send a message to the adaptive daemon process 906. For example and in one embodiment, user application process 902 may request a status on the personal hotspot service, to hold a power assertion to prevent idle sleep, perform a search, etc. In this embodiment, the user application process 902 sends a message 922 by using a user application connection 918 to create the message 920. This message 920 is sent to the kernel 906, where the kernel uses the kernel msg_send to enqueue the message 920 in a port queue 912 for the adaptive daemon process 904. In one embodiment, the port queues are a set of queues that are used by the kernel 906 to queue messages communicated with the adaptive daemon process 904. In one embodiment, the kernel msg_send 914 function of the kernel 906 sets an importance 908 for the message and takes an assertion 910 for the adaptive daemon process 904. For example and in one embodiment, the kernel 906 performs the message importance set and assertion take as described in FIG. 4 above.

With the message enqueued in the port queues 912, the kernel 906 performs a function kernel msg_recv 916 to dequeue the message from the port queues 912 and copies that message to a user buffer for the adaptive daemon process 904. In one embodiment, the kernel 906 dequeues and copies the message as described in FIG. 5 above.

The adaptive daemon process 904 receives the message 928 via daemon connection 932 as a message object 938. In one embodiment, the adaptive daemon process 904 does not reply to the message 928. In this embodiment, the message service 940 destroys a message object 938. In response to the message object destruction 934, the message service 940 drops the assertion 926 to the kernel. By dropping the assertion, the kernel 906 determines if the adaptive daemon process 904 is to demote the importance of the adaptive daemon process 904. In one embodiment, the kernel 906 determines if the adaptive daemon process 904 is to be demoted as described in FIG. 6 above.

In another embodiment, the message service prepares a reply to the received message 928. In this embodiment, the message service 940 creates a reply object 936 to the message object 938. In creating the reply object 936, the importance included in the message object 938 is transferred to the reply object 936. The message service 940 sends the reply to the user application process 904 via the daemon connection 932 and message 928 and through the kernel 906. In addition, by sending the reply, the message service 940 additionally destroys the reply object 930. Because the reply object has the importance set, destruction of the reply object causes the message service 940 to drop the assertion 926 to the kernel. By dropping the assertion, the kernel 906 determines if the adaptive daemon process 904 is to demote the importance of the adaptive daemon process 904. In one embodiment, the kernel 906 determines if the adaptive daemon process 904 is to be demoted as described in FIG. 6 above. In addition, the reply is sent using a message 828 via the port queues 912 to the user application process 902 using the msg_recv function of the message service 940. In this embodiment, the message service uses message 920 and user application connection 918 to deliver the reply to the user application process 902.

Figure 10:
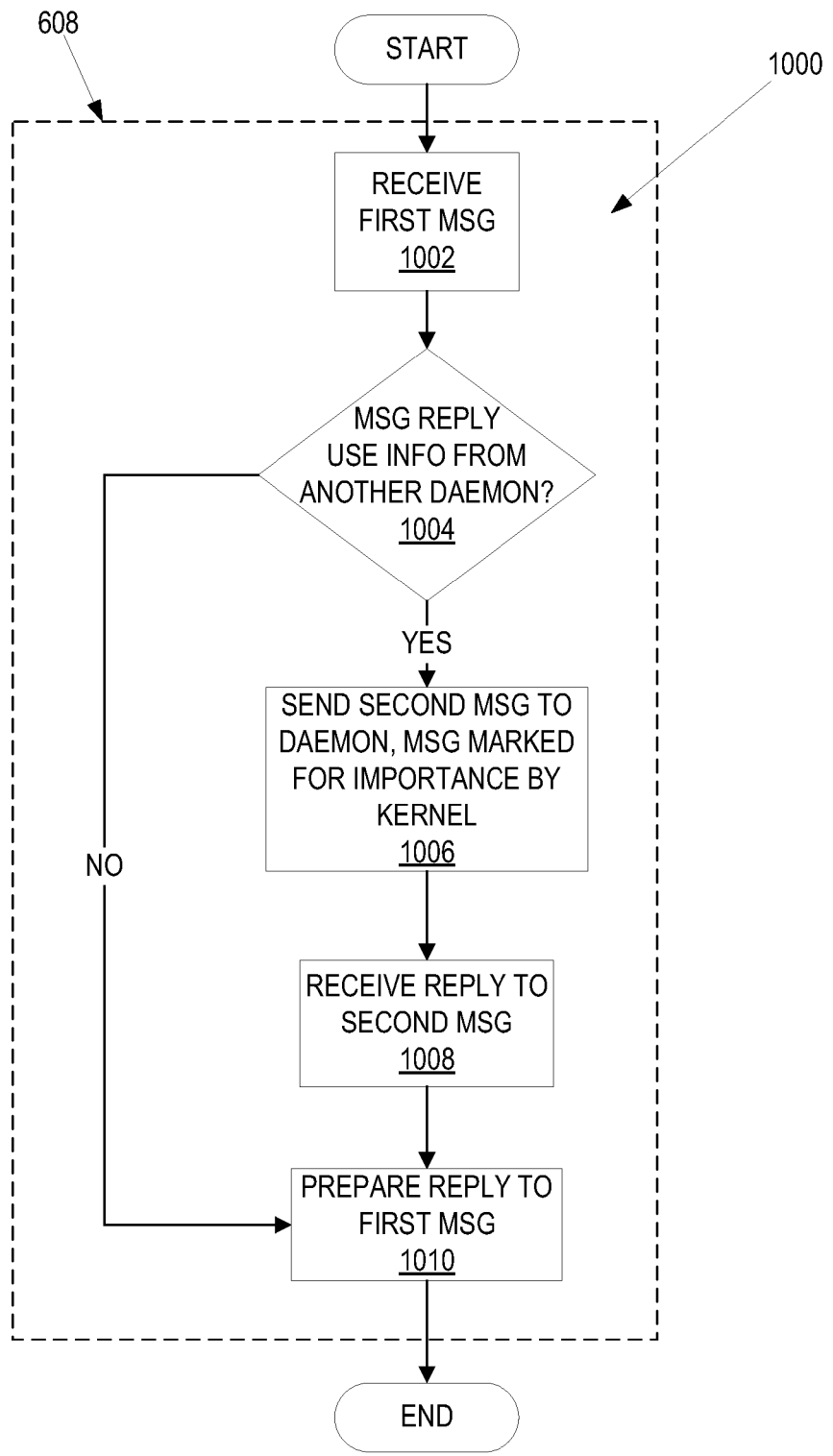
FIG. 10 is a flowchart of one embodiment of a process to promote a second daemon importance based on a message received by a first daemon.

As described above, the importance of a daemon process can be changed based on receipt of a message from a user application process. In another embodiment, a second daemon process can have the importance changed in response to another daemon sending a message from a user application process. FIG. 10 is a flowchart of one embodiment of a process 1000 to promote a second daemon importance based on a message received by a first daemon. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, a kernel, such as kernel 1132 of FIG. 11, performs the process 1000. In one embodiment, a daemon, that can receive a request from a user application process and request other information from another daemon, would perform process 1000. For example and in one embodiment, process 1000 could be performed by the message processing module 1128 of the daemon 1106A/1116 below. In FIG. 10, process 1000 begins by receiving a first message at block 1002. In one embodiment, this message is a message that carries an importance, such as a message from a user application process. In another embodiment, the message could be marked with an importance flag set. For example and in one embodiment, the message has an importance bit set as described above in FIG. 9. In a further embodiment, the message could be sent by another daemon, where the kernel marks the message as carrying importance. In this embodiment, by having a message that is from a daemon and marked as carrying importance, a string of daemon process priorities can be promoted and demoted. In one embodiment, receipt of this message by a daemon will have the process importance of this daemon promoted as described above in FIGS. 3A, 4, and in FIG. 10 below.

At block 1004, process 1000 determines if the reply for this message uses information from another daemon. For example and in one embodiment, a search daemon receives a search request. This search daemon, in order to fulfill the search requests, needs to determine the list of applications installed on the mobile device. The search daemon makes a request to an install daemon to get this list. If process 1000 does not use information from another daemon, execution proceeds to block 1010 below.

If process 1000 does use information from another daemon, at block 1006, process 1000 sends a second message to this other daemon, where the kernel marks this message as carrying an importance. In addition, the kernel promotes the importance of the other daemon, takes an assertion for this daemon, and queues this message for this other daemon. At block 1008, process 1000 receives a reply to the second message. Process 1000 prepares a reply to the first message and marks the reply message with importance, at block 1010. In addition, process 1000 drops the assertion for daemon that received the first message in block 1002. At block 1012, process 1000 sends the reply back to the process that sent the first message. In one embodiment, by sending this message, the promoted importance of the daemon performing process 1000 is demoted.

Figure 11:
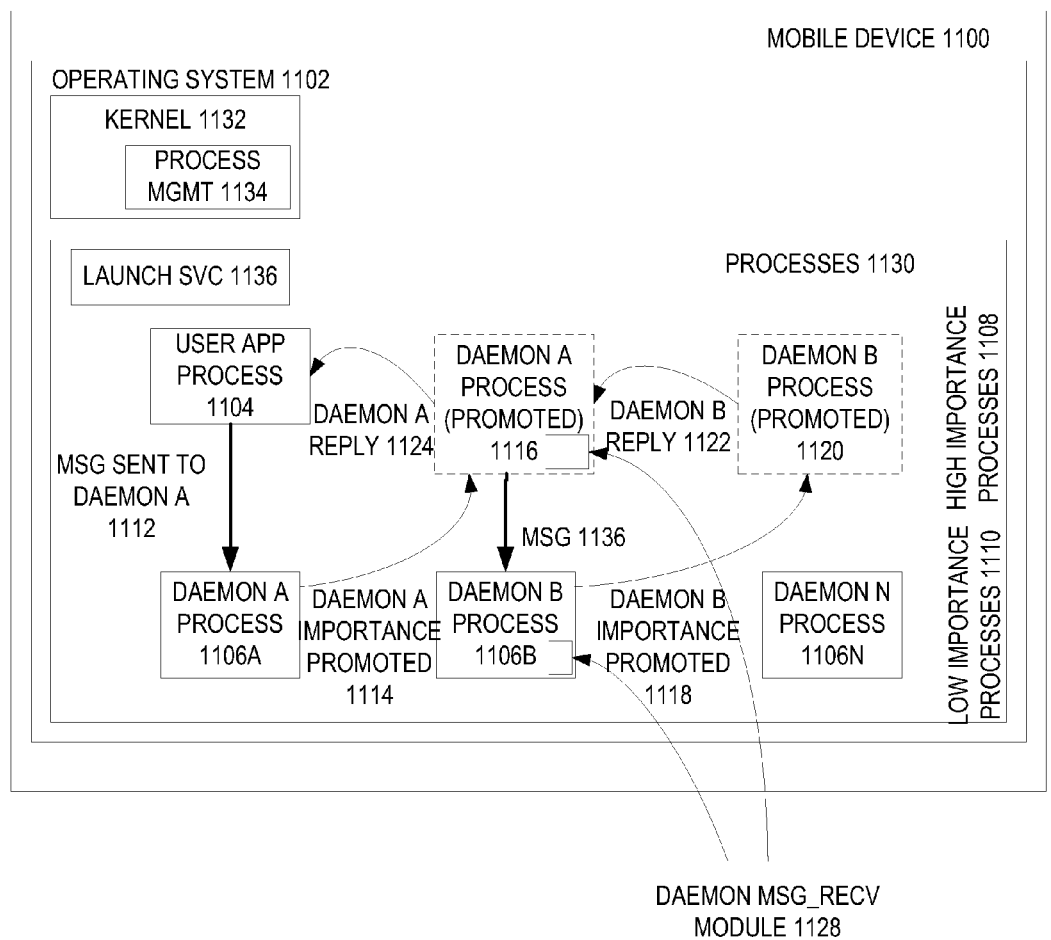
FIG. 11 is a block diagram one embodiment of a mobile device with a first daemon process communicating with a second daemon process and the importance of a second daemon process is promoted.

FIG. 11 is a block diagram one embodiment of a mobile device 1100 with a first daemon process 1106A communicating with a second daemon process 1106B and the importance of a second daemon process 1106B is promoted. In FIG. 11, the mobile device 1100 includes an operating system 1102 that manages the execution of a user application process 1104 and daemon processes 1106A-N. In addition, the user application process 1104 is running at a high importance and the daemon processes 1106A-N initially run at a lower importance. When the user application process 1104 requests a service from a daemon process (e.g., daemon process 1106A), this daemon process is promoted to a higher importance to process this service request. In one embodiment, this daemon 1106A is called an adaptive daemon. For example and in one embodiment, the user application process 1104 makes a service request to the daemon 1106A via message 1112. In response to the daemon 1106A receiving the message, the importance of the daemon is promoted to a higher importance, daemon 1116. While in one embodiment, the importance of the promoted daemon 1116 is the same as the requesting user application process 1104, in alternative embodiments, the promoted process of the daemon 1116 can be greater or lesser than the importance of the requesting user application process 1104.

In response to the daemon A process 1116 receiving the message and the importance being promoted, daemon A process sends another message 1136 to daemon B process 1106B. This message 1136 can be the same message sent to daemon A or can be a different message. In response to the daemon 1106B receiving the message 1136, the importance of the daemon B is promoted to a higher importance, daemon B 1120. While in one embodiment, the importance of the promoted daemon B 1120 is the same as the initial requesting user application process 1104, in alternative embodiments, the promoted process of the daemon 1120 can be greater or lesser than the importance of the requesting user application process 1104.

In this embodiment, the promoted daemon B 1120 processes the second message and sends a reply 1122 to daemon A 1116. In addition, the importance of the daemon B process is demoted to the default importance for daemon B 1106B. In one embodiment, the daemon process B 1120 takes the assertion and the kernel can demote the importance of daemon B process 1120. In response to receiving the reply 1122, daemon A forms a reply to the initial message 1112 and sends that message to the user application process 1104. In addition, the importance of daemon A process 1116 is demoted to the default importance for this process. In one embodiment, the operating system kernel 1132 handles the daemon process promotion and demotion. In another embodiment, the operating system kernel 1132 handles the daemon process promotion and demotion using a message service 1134. In this embodiment, the process management 1134 handles the sending and receiving of the messages between the user application process 1104, the daemon process 1106A/1116, and the daemon process 1106B/1120. By handling the message passing between these processes, the process management 1132 can manage the daemon process promotion and demotion.

For example and in one embodiment, consider an example of a search using a search daemon is made. In this example, the search daemon is an adaptive daemon that can have the search daemon process importance promoted as a result of receiving a search request from a user application process. In response to receiving a search request message, the search daemon sends a second message to an install daemon to obtain the list of installed applications on the mobile device. The search daemon, which has acquired an importance promotion itself, donates this importance by sending the second message for the list of installed applications to the install daemon. In this example, the install daemon will have its importance promoted upon receipt of the second message from the search daemon. In addition, the importance of the install daemon is demoted to the default importance of the install daemon upon the install daemon sending a reply to the search daemon. In one embodiment, the message handing and daemon process promotion/demotion is handled by the messages service, such as message service 1034 described above.

Figure 12:
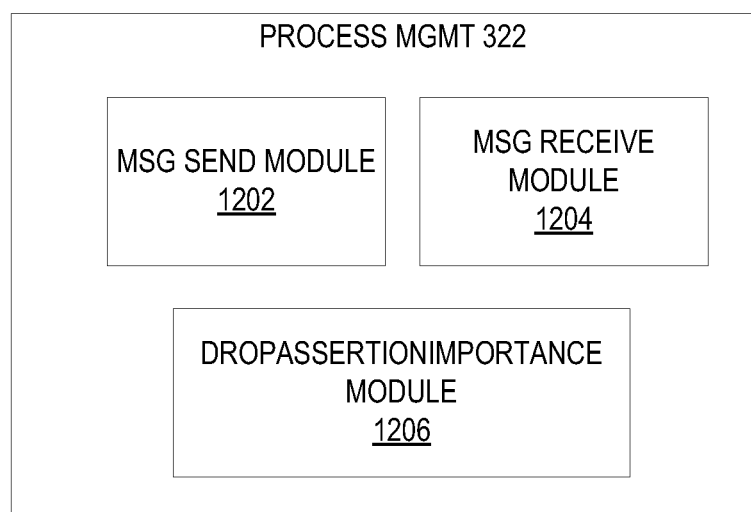
FIG. 12 is a message service module to facilitate sending and receiving of message by processes.

FIG. 12 is a process management module 322 to management the sending and receiving of message between processes. In one embodiment, the process management module 322 is used by a kernel to facilitate the sending and receiving message, such as kernel 320 of FIGS. 3A-B and/or kernel 1032 of FIG. 10. In one embodiment, process management module 322 includes message send module 1202, message receive module 1204, and drop assertion importance module 1206. In this embodiment, the message send module 1202 sends a message as described in FIG. 4 above. The message receive module 1204 receives as described in FIG. 5 above. The drop assertion importance module 1206 drops an assertion as described in FIG. 6 above.

Figure 13:
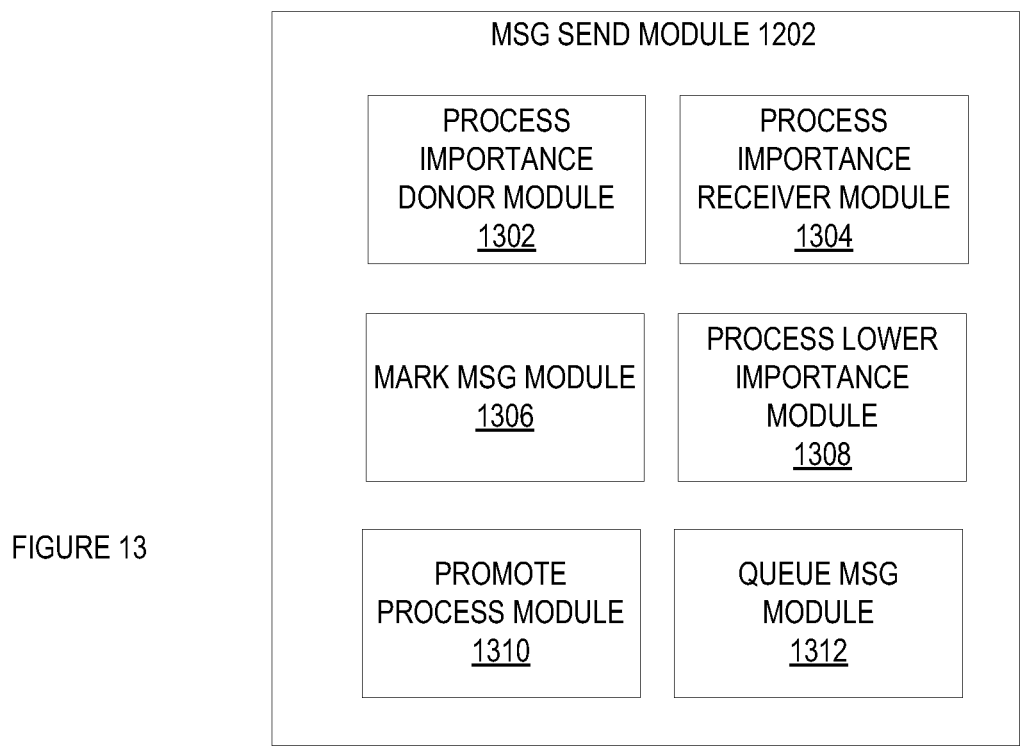
FIG. 13 is a message send module to send a message that is used to promote a daemon importance based on a message received by the daemon.

FIG. 13 is a message send module 1202 to send a message that is used to promote a daemon importance based on a message destined to that daemon. In one embodiment, the message send module 1202 includes process importance donor module 1302, process importance receiver module 1304, mark message module 1306, process lower importance module 1308, promote process module 1310, and queue message module 1312. In one embodiment, the process importance donor module 1302 determines if the current process is an importance donor as described in FIG. 4, block 402 above. The process importance receiver module 1304 determines if the target process is an importance receiver as described in FIG. 4, block 404 above. The mark message module 1306 marks the message and increments an importance assertion count as described in as described in FIG. 4, block 406 above. The process lower importance module 1308 determines if the target process has a lower importance as described in FIG. 4, block 408 above. The promote process module 1310 changes the target process importance as described in FIG. 4, block 410 above. The queue message module 1312 queues the message on the port as described in FIG. 4, block 413 above.

Figure 14:
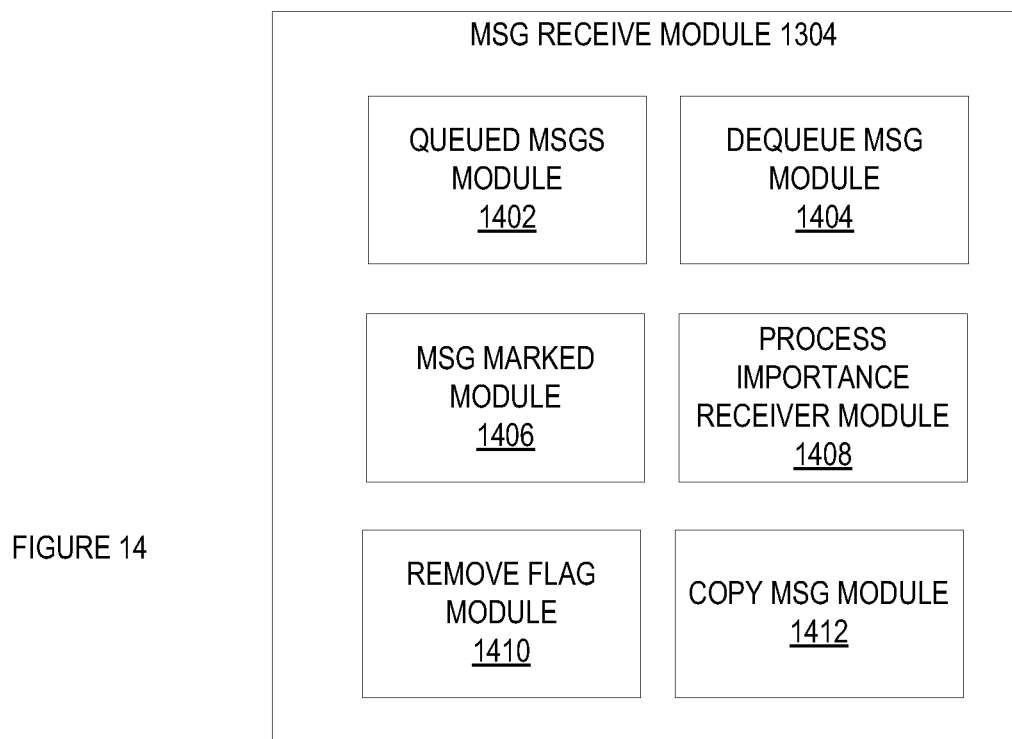
FIG. 14 is a message receive module to receive a message that is used to promote a daemon importance of the daemon.

FIG. 14 is a message receive module 1204 to receive a message that is used to promote a daemon importance based on a message destined to that daemon. In one embodiment, the message receive module 1204 includes a queued messages module 1402, dequeue message module 1404, message marked module 1406, process importance receiver module 1408, remove flag module 1410, and copy message module 1412. In one embodiment, the queued messages module 1402 determines if there are queued messages as described in FIG. 5, block 502 above. The dequeue message module 1404 dequeues message from the port as described in FIG. 5, block 504 above. The message marked module 1406 determines if the message is marked for importance as described in FIG. 5, block 506 above. The process importance receiver module 1408 determines if the current process is an adaptive daemon process as described in FIG. 5, block 508 above. The remove flag module 1410 removes the flag and decrements the importance count as described in FIG. 5, block 510 above. The copy message module 1412 copies the message to the user buffer as described in FIG. 5, block 512 above.

Figure 15:
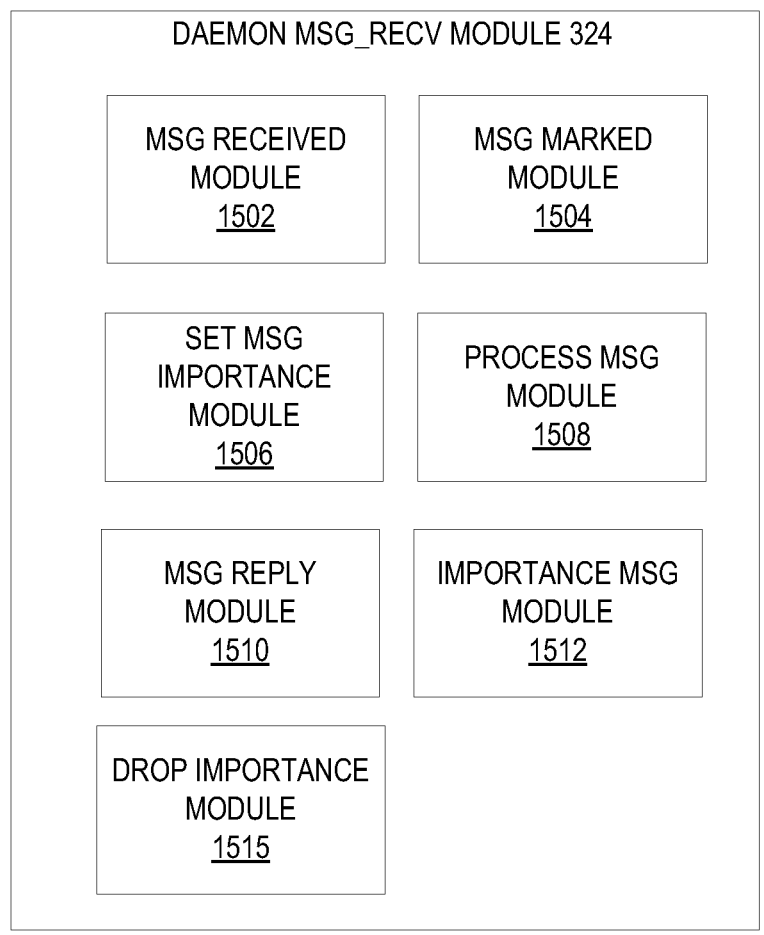
FIG. 15 is a user receive module to receive a message that is used to promote a daemon importance based on a message received by the daemon.

FIG. 15 is a daemon msg_recv module 324 to receive a message that is used to promote a daemon importance. In one embodiment, the daemon msg_recv module 324 includes message received module 1502, message marked module 1504, set message importance module 1506, process message module 1508, message reply module, importance message module, and drop importance module 1514. In this embodiment, the message received module 1502 determines if a message is received as described in FIG. 6, block 602. The message marked module 1504 marks the message for importance as described in FIG. 6, block 604. The set message importance module 1506 sets the importance as true as described in FIG. 6, block 606. The process message module 1508 processes the message and performs the needed action as described in FIG. 6, block 608. The message reply module 1510 sends the reply as described in FIG. 6, block 610. The importance message module 1512 determines if the message is marked as important as described in FIG. 6, block 612. The drop importance module 1514 drops an importance assertion as described in FIG. 6, block 614.

Figure 16:
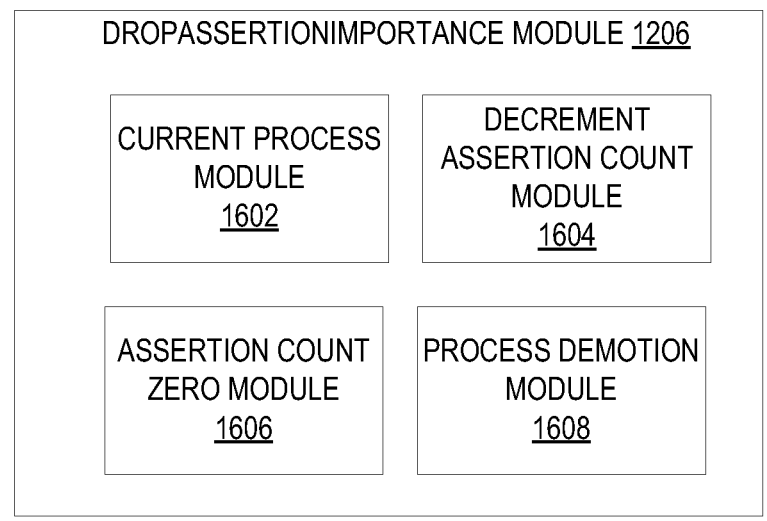
FIG. 16 is a drop assertion importance module to drop an importance assertion.

FIG. 16 is a drop assertion importance module 1206 to drop an importance assertion. In one embodiment, the drop importance module 1206 includes current process module 1602, decrement assertion count module 1604, assertion count zero module 1606, and process demotion module 1608. In this embodiment, current process module 1602 determines if the current process is an importance process as described in FIG. 7, block 702 above. The decrement assertion count module 1604 decrements an importance assertion count as described in FIG. 7, block 704 above. The assertion count zero module 1606 determines an importance assertion count as described in FIG. 7, block 706 above. The process demotion module 1608 demotes the current process as described in FIG. 7, block 708 above.

Figure 17:
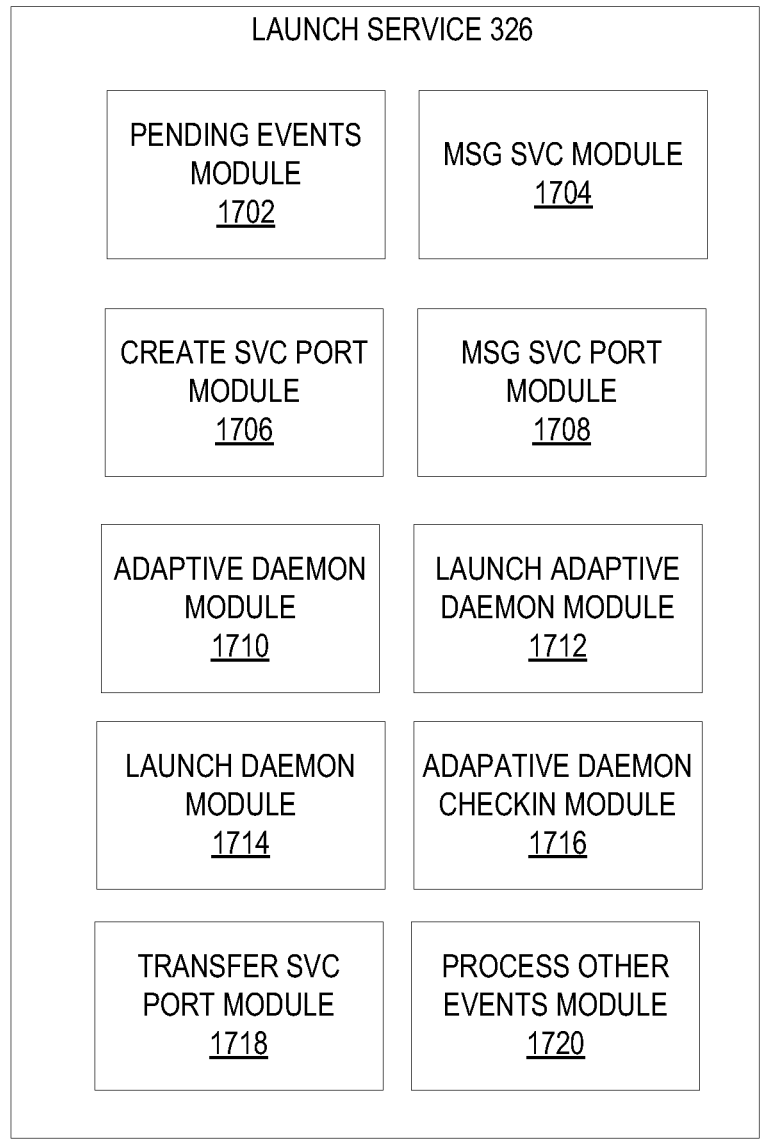
FIG. 17 is a launch service module to launch a service on demand.

FIG. 17 is a launch service 326 to launch a service on demand. In one embodiment, the launch service includes pending events module 1702, message service module 1704, create service port module 1706, message service port module 1708, adaptive daemon module 1710, launch adaptive daemon 1712, launch daemon module 1714, adaptive daemon check-in module 1716, transfer service port module 1718, and process other events module 1720. In this embodiment, the pending events module 1702 determines if there are any pending events as described in FIG. 8, block 802 above. The message service module 1704 determines if there is a message service to be created as described in FIG. 8, block 804 above. The create service port module 1706 creates a service port and adds this service port to the watch list as described in FIG. 8, block 806 above. The message service port module 1708 determines if there is a message on the service port as described in FIG. 8, block 808 above. The adaptive daemon module 1710 determines if the message is for an adaptive daemon as described in FIG. 8, block 810 above. The launch adaptive daemon 1712 launches an adaptive daemon as described in FIG. 8, block 812 above. The launch daemon module 1714 launches a daemon as described in FIG. 8, block 814 above. The adaptive daemon check-in module 1716 determines if an adaptive daemon has checked in after launch as described in FIG. 8, block 816 above. The transfer service port module 1718 transfers the service port to the adaptive daemon as described in FIG. 8, block 818 above. The process other events module 1720 processes other events as described in FIG. 8, block 820 above.

Figure 18:
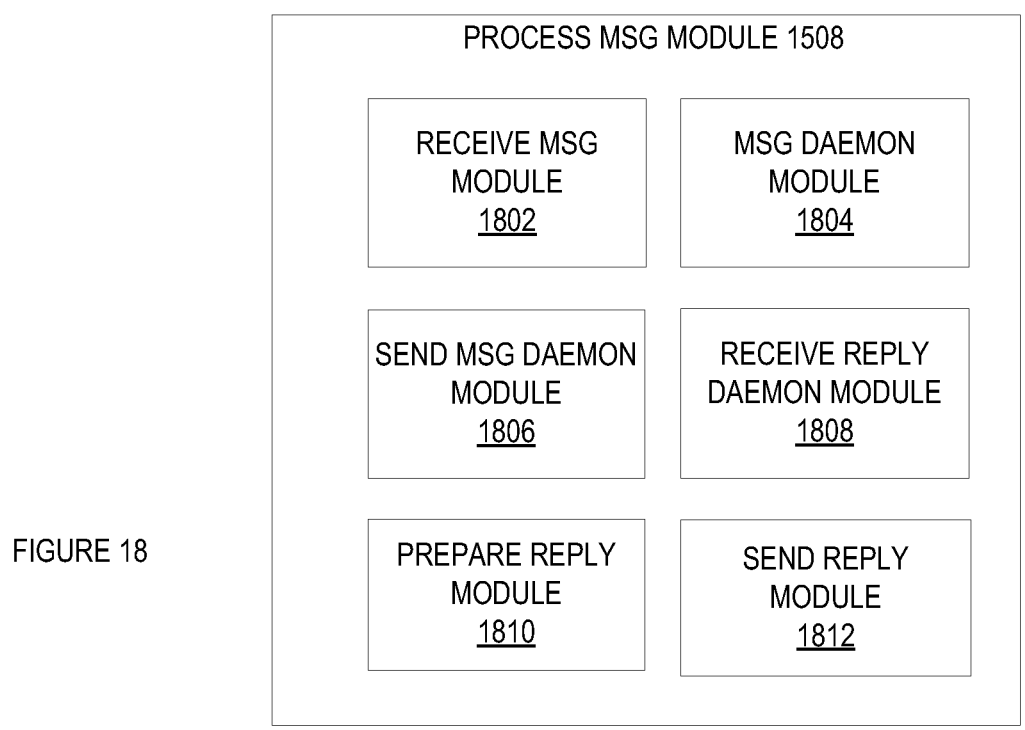
FIG. 18 is a message processing module to promote a second daemon importance based on a message received by a first daemon.

FIG. 18 is a message processing module 1508 to promote a second daemon importance based on a message received by a first daemon. In one embodiment, the message processing module 1508 includes receive message module 1802, message daemon module 1804, send message daemon module 1806, receive reply daemon module 1808, prepare reply module 1810, and send reply module 1812. In this embodiment, the receive message module 1802 receives the first message as described in FIG. 9, block 902 above. The message daemon module 1804 determines if first message reply requires information from another daemon as described in FIG. 9, block 904 above. The send message daemon module 1806 sends a second message to the other daemon as described in FIG. 9, block 906 above. The receive reply daemon module 1808 receive the reply as described in FIG. 9, block 908 above. The prepare reply module 1810 prepares the reply message to the first message as described in FIG. 9, block 910 above. The send reply module 1812 sends the reply as described in FIG. 9, block 912 above.

Figure 19:
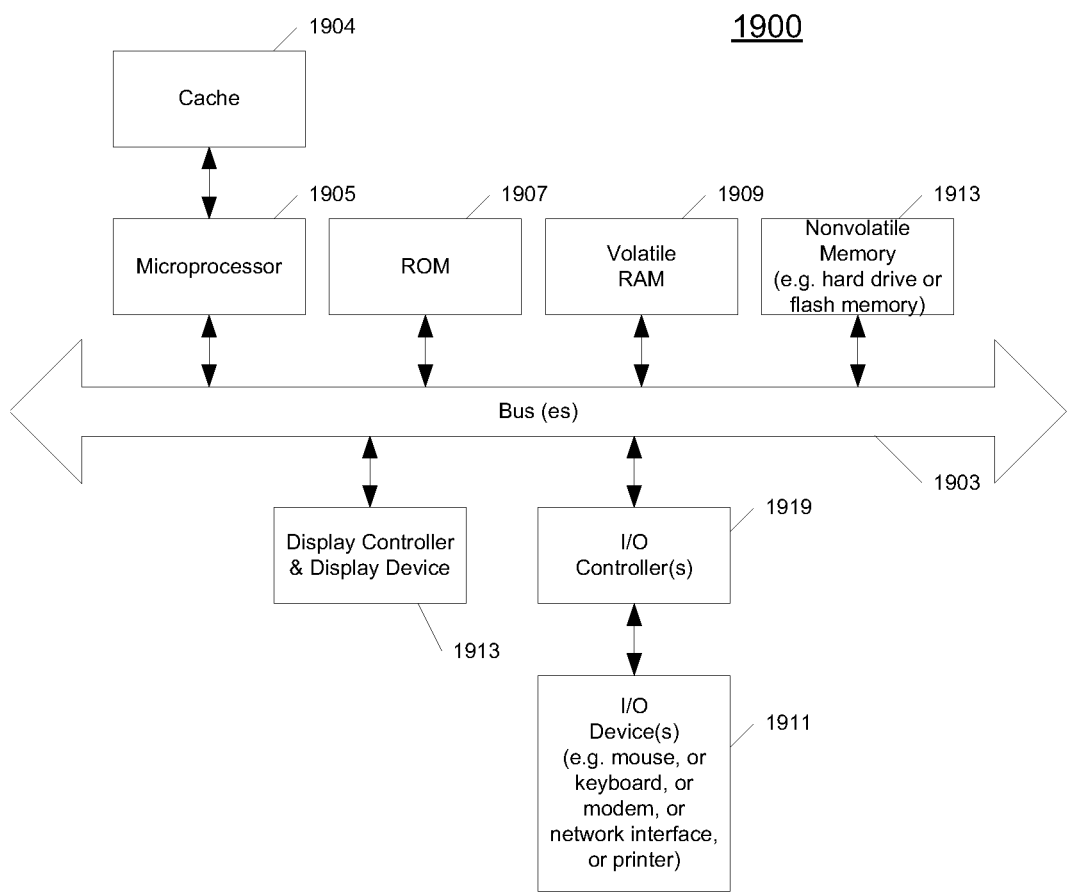
FIG. 19 illustrates one example of a typical computer system, which may be used in conjunction with the embodiments described herein.

FIG. 19 shows one example of a data processing system 1900, which may be used with one embodiment of the present invention. For example, the system 1900 may be implemented including a device 300 as shown in FIGS. 3A-B. Note that while FIG. 19 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 19, the computer system 1900, which is a form of a data processing system, includes a bus 1903 which is coupled to a microprocessor(s) 1905 and a ROM (Read Only Memory) 1907 and volatile RAM 1909 and a non-volatile memory 1911. The microprocessor 1905 may retrieve the instructions from the memories 1907, 1909, 1911 and execute the instructions to perform operations described above. The bus 1903 interconnects these various components together and also interconnects these components 1905, 1907, 1909, and 1911 to a display controller and display device 1913 and to peripheral devices such as input/output (I/O) devices which may be mice, keyboards, modems, network interfaces, printers and other devices which are well known in the art. Typically, the input/output devices 1915 are coupled to the system through input/output controllers 1913. The volatile RAM (Random Access Memory) 1909 is typically implemented as dynamic RAM (DRAM), which requires power continually in order to refresh or maintain the data in the memory.

The mass storage 1911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1911 will also be a random access memory although this is not required. While FIG. 19 shows that the mass storage 1911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1903 may include one or more buses connected to each other through various bridges, controllers and/or adapters as is well known in the art.

Figure 20:
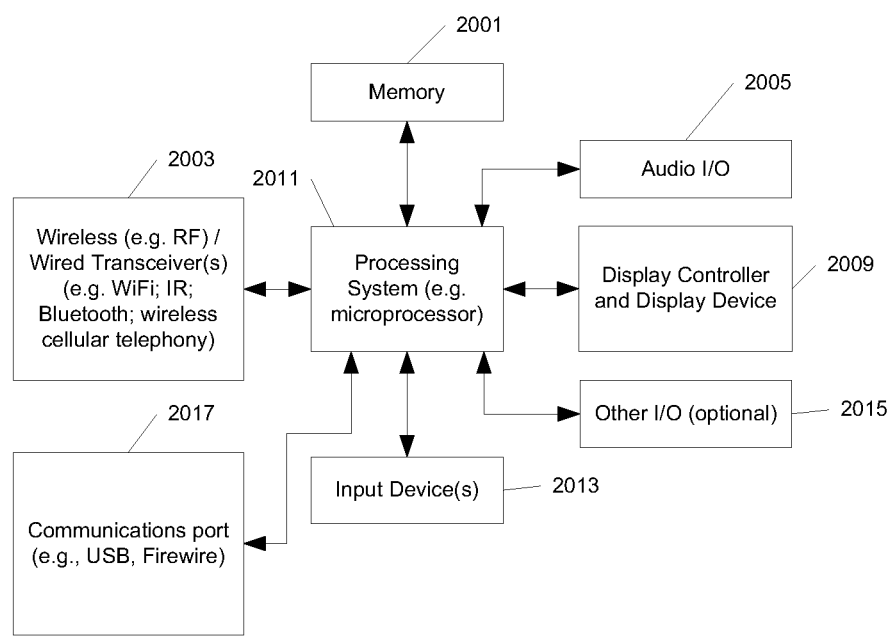
FIG. 20 shows an example of a data processing system, which may be used with one embodiment of the present invention.

FIG. 20 shows an example of another data processing system 2000 which may be used with one embodiment of the present invention. For example, system 2000 may be implemented as a device 300 as shown in FIGS. 3A-B. The data processing system 2000 shown in FIG. 20 includes a processing system 2011, which may be one or more microprocessors, or which may be a system on a chip integrated circuit, and the system also includes memory 2001 for storing data and programs for execution by the processing system. The system 2000 also includes an audio input/output subsystem 2005, which may include a microphone and a speaker for, for example, playing back music or providing telephone functionality through the speaker and microphone.

A display controller and display device 2009 provide a visual user interface for the user; this digital interface may include a graphical user interface which is similar to that shown on a Macintosh computer when running OS X operating system software, or Apple iPhone when running the iOS operating system, etc. The system 2000 also includes one or more wireless transceivers 2003 to communicate with another data processing system, such as the system 2000 of FIG. 20. A wireless transceiver may be a WLAN transceiver, an infrared transceiver, a Bluetooth transceiver, and/or a wireless cellular telephony transceiver. It will be appreciated that additional components, not shown, may also be part of the system 2000 in certain embodiments, and in certain embodiments fewer components than shown in FIG. 20 may also be used in a data processing system. The system 2000 further includes one or more communications ports 2017 to communicate with another data processing system, such as the system 1500 of FIG. 15. The communications port may be a USB port, Firewire port, Bluetooth interface, etc.

The data processing system 2000 also includes one or more input devices 2013, which are provided to allow a user to provide input to the system. These input devices may be a keypad or a keyboard or a touch panel or a multi touch panel. The data processing system 2000 also includes an optional input/output device 2015 which may be a connector for a dock. It will be appreciated that one or more buses, not shown, may be used to interconnect the various components as is well known in the art. The data processing system shown in FIG. 20 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 2000 may be a network computer or an embedded processing device within another device, or other types of data processing systems, which have fewer components or perhaps more components than that shown in FIG. 20.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "making," "processing," "sending," "promoting," "demoting," "returning," "computing," "enqueuing," "transferring," "launching," "forwarding," "decrementing," "maintaining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to change an importance of a first daemon process, the method comprising:
    receiving a first message from a user process destined for the first daemon process, wherein the first daemon process executes independently of the user process, the first daemon process communicates messages with other executing processes, and the first message is a service request for a service provided by the first daemon process from the user process;
    determining if the first message indicates that the importance of the first daemon process can be changed;
    if the first message indicates the importance of the first daemon process can be changed,
        changing the importance of the first daemon process from a lower importance value to a higher importance value;

forwarding the first message to the first daemon process, wherein the first daemon process services the service request at the higher importance value and the forwarding includes,
  enqueueing the message in a port queue for the first daemon process; and
  changing the importance of the first daemon process back to the lower importance value after the first daemon process services the service request.

2. The non-transitory machine-readable medium of claim 1, wherein the user process is running at the higher importance value.

3. The non-transitory machine-readable medium of claim 1, wherein the changing the importance of the first daemon process changes importance of the first daemon process to an importance that is the same as the user process.

4. The non-transitory machine-readable medium of claim 1, wherein the determining comprises:
  determining if the message is destined for a first daemon process that can have the importance of the first daemon process changed.

5. The non-transitory machine-readable medium of claim 1, further comprising:
  maintaining a count of assertions for the first daemon process;
  receiving a drop assertion for the first daemon process;
  decrementing the count of assertions for the first daemon process; and
  if the count of assertions for the first daemon process is zero,
    changing the importance of the first daemon process to the lower importance.

6. The non-transitory machine-readable medium of claim 1, further comprising:
  receiving a second message from the user process destined for a second daemon process, wherein the second daemon process is executing, the second daemon process executes independently of the first daemon process, and the second daemon process communicates messages with the other executing processes;
  determining if the second message indicates that an importance of the second daemon process can be changed;
  if the second message indicates the importance of the second daemon process can be changed,
    changing the importance of the second daemon process; and
  forwarding the second message to the second daemon process.

7. The non-transitory machine-readable medium of claim 6, wherein the changing the importance of the second daemon process changes the importance of the second daemon process being changed to an importance that is the same as the user process.

8. The non-transitory machine-readable medium of claim 1, further comprising:
  marking the first message as carrying importance.

9. The non-transitory machine-readable medium of claim 1, wherein the forwarding of the first message to the first daemon process is in response to the changing of the first daemon process importance.

10. The non-transitory machine-readable medium of claim 1, wherein the user process is a process for a user application that is executing in the foreground.

11. The non-transitory machine-readable medium of claim 1, wherein the first daemon process is running in the background.

12. The non-transitory machine-readable medium of claim 1, wherein a process importance is indicates that an action is needed on behalf of the user.

13. A non-transitory machine-readable medium having executable instructions to cause one or more processing units to perform a method to change an importance of an adaptive daemon process, the method comprising:
  receiving a message from an importance donor process destined for the adaptive daemon process, wherein the adaptive daemon has yet to be launched;
  determining if the message indicates that the importance of the adaptive daemon process can be changed;
  if the message indicates the importance of the adaptive daemon process can be changed,
    launching the adaptive daemon process with an importance that is different than a default importance associated with the adaptive daemon process; and
  forwarding the message to the launched adaptive daemon process.

14. The non-transitory machine-readable medium of claim 13, wherein the adaptive daemon process is a daemon process with a changeable process importance.

15. The non-transitory machine-readable medium of claim 13, wherein the importance donor process is a process that can donate an importance to another process.

16. The non-transitory machine-readable medium of claim 15, wherein the importance donor process is selected from the group consisting of a user application process and another adaptive daemon process whose importance has been promoted.

17. The non-transitory machine-readable medium of claim 13, wherein the adaptive daemon process importance is promoted to an importance of the importance donor.

18. The non-transitory machine-readable medium of claim 13, wherein the message is a service request from the importance donor process to the adaptive daemon process.

19. An apparatus to change an importance of a first daemon process, the system comprising:
  means for receiving a first message from a user process destined for the first daemon process, wherein the first daemon process executes independently of the user process, the first daemon process communicates messages with other executing processes, and the message is a service request for a service provided by the first daemon process from the user process;
  means for determining if the first message indicates that the importance of the first daemon process can be changed;
  means for changing the importance of the first daemon process from a lower importance value to a higher value if the first message indicates the importance of the first daemon process can be changed;
means for forwarding the first message to the first daemon process, wherein the first daemon process services the service request at the higher importance value and the forwarding includes,
  enqueueing the message in a port queue for the first daemon process; and
means for changing the importance of the first daemon process back to the lower importance value after the first daemon process services the service request.

20. The apparatus of claim 19, wherein the user process is running at a higher importance higher than the first daemon process.

21. The apparatus of claim 19, wherein the changing the importance of the first daemon process changes importance of the first daemon process to an importance that is the same as the user process.

22. The apparatus of claim 19, wherein the forwarding of the first message to the first daemon process is in response to the changing of the first daemon process importance.

23. The non-transitory machine-readable medium of claim 1, wherein if the number of service requests being handled by the first daemon process is zero, changing the importance of the first daemon process to the lower importance.

* * * * *